United States Patent
Havelka et al.

(10) Patent No.: US 9,998,597 B2
(45) Date of Patent: Jun. 12, 2018

(54) SYSTEMS AND METHODS FOR FACILITATING COMMUNICATION USING AN INTERACTIVE COMMUNICATION SYSTEM

(71) Applicant: Nuance Communications, Inc., Burlington, MA (US)

(72) Inventors: Jiri Havelka, Rudna (CZ); Raimo Bakis, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 285 days.

(21) Appl. No.: 14/792,137

(22) Filed: Jul. 6, 2015

(65) Prior Publication Data

US 2017/0013124 A1    Jan. 12, 2017

(51) Int. Cl.
  *H04M 1/64* (2006.01)
  *H04M 3/51* (2006.01)
  *H04M 3/523* (2006.01)

(52) U.S. Cl.
  CPC ....... *H04M 3/5166* (2013.01); *H04M 3/5175* (2013.01); *H04M 3/5235* (2013.01)

(58) Field of Classification Search
  CPC ................................................. H04M 3/5166
  See application file for complete search history.

(56) References Cited

U.S. PATENT DOCUMENTS

| | | | | |
|---|---|---|---|---|
| 6,898,277 B1 * | 5/2005 | Meteer | ................ | H04M 3/5166 379/265.02 |
| 6,922,466 B1 * | 7/2005 | Peterson | ........... | H04M 3/42221 379/265.02 |
| 7,003,079 B1 * | 2/2006 | McCarthy | ............. | H04M 3/493 379/265.02 |
| 7,039,166 B1 * | 5/2006 | Peterson | ............... | H04M 3/493 379/265.03 |
| 2003/0088409 A1 * | 5/2003 | Harris | ...................... | G10L 17/26 704/231 |
| 2005/0080628 A1 * | 4/2005 | Kuperstein | ......... | H04M 3/4938 704/270.1 |
| 2006/0265090 A1 * | 11/2006 | Conway | ............ | H04M 3/42221 700/94 |
| 2007/0160054 A1 * | 7/2007 | Shaffer | ............... | H04M 3/5175 370/395.2 |

* cited by examiner

*Primary Examiner* — Joseph T Phan
(74) *Attorney, Agent, or Firm* — Wolf, Greenfield & Sacks, P.C.

(57) ABSTRACT

An interactive communication system configured to conduct a call with a caller. The interactive communication system comprises at least one computer hardware processor configured to perform: obtaining a plurality of dialog chunks comprising information provided by the caller to the interactive communication system and information provided by the interactive communication system to the caller; generating, based on the plurality of dialog chunks, a respective plurality of feature sets, each of the plurality of feature sets comprising at least one feature generated using a respective dialog chunk of the plurality of dialog chunks; determining, based on the plurality of feature sets, a respective plurality of dialog chunk scores; determining, based at least in part on the plurality of dialog chunk scores, a likelihood that the caller is dissatisfied with the interactive communication system; and when the likelihood exceeds a threshold, performing a remedial action that alters how the call is handled.

20 Claims, 6 Drawing Sheets

SYSTEMS AND METHODS FOR FACILITATING COMMUNICATION USING AN INTERACTIVE COMMUNICATION SYSTEM

BACKGROUND

An interactive communication system allows people to interact with a computerized system using voice, text, or a combination of voice and text. An interactive communication system allows a person interacting with the system to provide input by using keys on a telephonic keypad or a computer keyboard, by speaking, or any suitable combination thereof. An interactive communication system can provide acoustic output, graphic output, and/or textual output to the user. An interactive voice response (IVR) system is one example of an interactive communication system, which is configured to provide acoustic output to the user. An IVR system typically presents acoustic output to the person by playing either pre-recorded or dynamically generated speech, and/or may provide output using other sources of audio.

SUMMARY

Some aspects of the technology described herein are directed to a method for conducting a call between a caller and an interactive communication system. The method comprises using at least one computer hardware processor to perform: obtaining a plurality of dialog chunks comprising information provided by the caller to the interactive communication system and information provided by the interactive communication system to the caller; generating, based on the plurality of dialog chunks, a respective plurality of feature sets, each of the plurality of feature sets comprising at least one feature generated using a respective dialog chunk of the plurality of dialog chunks; determining, based on the plurality of feature sets, a respective plurality of dialog chunk scores; determining, based at least in part on the plurality of dialog chunk scores, a likelihood that the caller is dissatisfied with the interactive communication system; and when the likelihood exceeds a threshold, performing a remedial action that alters a manner in which the call is handled.

Some aspects of the technology described herein are directed to an interactive communication system configured to conduct a call with a caller. The interactive communication system comprises at least one computer hardware processor configured to perform: obtaining a plurality of dialog chunks comprising information provided by the caller to the interactive communication system and information provided by the interactive communication system to the caller; generating, based on the plurality of dialog chunks, a respective plurality of feature sets, each of the plurality of feature sets comprising at least one feature generated using a respective dialog chunk of the plurality of dialog chunks; determining, based on the plurality of feature sets, a respective plurality of dialog chunk scores; determining, based at least in part on the plurality of dialog chunk scores, a likelihood that the caller is dissatisfied with the interactive communication system; and when the likelihood exceeds a threshold, performing a remedial action that alters a manner in which the call is handled.

Some aspects of the technology described herein are directed to at least one non-transitory computer-readable storage medium storing processor-executable instructions that, when executed by at least one computer hardware processor, cause the at least one computer hardware processor to perform a method for conducting a call between a caller and an interactive voice response interactive communication system. The method comprises: obtaining a plurality of dialog chunks comprising information provided by the caller to the interactive communication and information provided by the interactive communication to the caller; generating, based on the plurality of dialog chunks, a respective plurality of feature sets, each of the plurality of feature sets comprising at least one feature generated using a respective dialog chunk of the plurality of dialog chunks; determining, based on the plurality of feature sets, a respective plurality of dialog chunk scores; determining, based at least in part on the plurality of dialog chunk scores, a likelihood that the caller is dissatisfied with the interactive communication system; and when the likelihood exceeds a threshold, performing a remedial action that alters a manner in which the call is handled.

The foregoing is a non-limiting summary of the invention, which is defined by the attached claims.

BRIEF DESCRIPTION OF DRAWINGS

Various aspects and embodiments of the application will be described with reference to the following figures. The figures are not necessarily drawn to scale. Items appearing in multiple figures are indicated by the same or a similar reference number in all the figures in which they appear.

DETAILED DESCRIPTION

Figure 1:
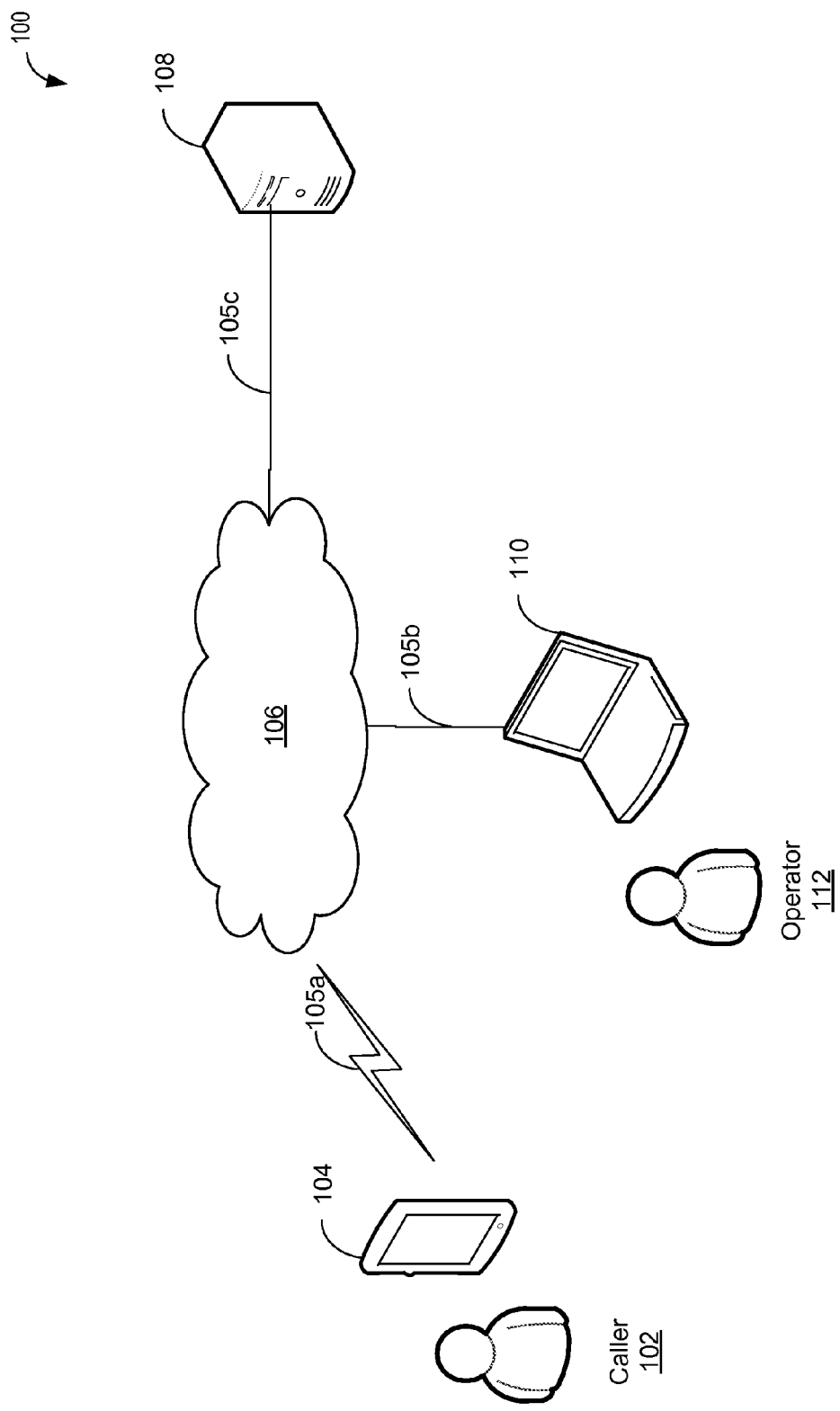
FIG. 1 is a diagram of an illustrative computing environment in which some embodiments of the technology described herein may operate.

A person interacting with a conventional interactive communication system (ICS) may become dissatisfied with how the ICS is performing during the interaction. For example, a person may become dissatisfied when a conventional ICS (e.g., a conventional interactive voice response system) incorrectly recognizes or understands input provided by the person to the ICS. As another example, a person may become dissatisfied if the ICS requires the person to provide a large amount of information to handle a relatively simple task. As another example, a person may become dissatisfied with a conventional ICS when attempting to perform a task that the ICS is not programmed to handle. When a person becomes dissatisfied with performance of an ICS, the person may terminate his/her interaction with the ICS (e.g., hang-up a call) and, in some circumstances, not wish to use the interactive communication system again.

The inventors have appreciated that detecting that a person likely is or likely will become dissatisfied with an interactive communication system may allow the ICS to take remedial action and alter the way in which it is interacting with the person to improve the person's experience. For example, upon determining that a caller likely is or will become dissatisfied with the ICS, the ICS may transfer the call to a human operator, alter the way in which it is conducting a dialog with the caller (e.g., by presenting the caller with different output than the system originally planned), apologize to the caller, and/or take any other remedial action. The sooner that an interactive communication system is able to detect a caller's dissatisfaction, the sooner the interactive communication system can take remedial action to improve the caller's experience, and avoid the caller's experience from deteriorating any further. Accordingly, in some embodiments, an interactive communication system may improve the way in which it services a call from a caller by determining, based at least in part on information provided by the caller during the call, a likelihood that a caller is dissatisfied with the interactive communication system and, when the likelihood exceeds a predetermined threshold, performing a remedial action that alters the way in which the caller's call is handled going forward.

Some embodiments of the technology described herein address some of the above-discussed drawbacks of conventional interactive communication systems. However, not every embodiment addresses every one of these drawbacks, and some embodiments may not address any of them. As such, it should be appreciated that aspects of the technology described herein are not limited to addressing all or any of the above discussed drawbacks of conventional interactive communication systems.

Accordingly, in some embodiments, an interactive communication system (ICS) may service a call from a caller by determining a score for each of multiple portions of the call, and using the determined scores to obtain an overall likelihood that the caller is dissatisfied with the ICS. The score for a particular portion of the call may provide an indication of the caller's dissatisfaction (if any) with the interactive communication system during the particular portion of the call, whereas the overall likelihood may provide a global measure of the caller's dissatisfaction with the interactive communication system because it is based on information obtained throughout the entire call rather than only a single portion of the call. When the likelihood exceeds a predetermined threshold, indicating that the level of the caller's dissatisfaction is sufficiently high to warrant intervention, the interactive communication system may perform a remedial action that alters how the call is handled. For example, the interactive communication system may transfer the call to a human operator, change the dialog plan according to which the interactive communication system is interacting with the caller during the call, apologize to the caller, and/or perform any other suitable remedial action.

In some embodiments, a call between a caller and an interactive communication system may comprise one or more dialog chunks, each dialog chunk comprising information provided by the caller to the interactive communication system during a single turn and/or information provided by the interactive communication system to the caller in a single turn, and the interactive communication system may determine a score for each of the dialog chunks and use the determined scores to obtain the overall likelihood that the caller is dissatisfied with the interactive communication system.

In some embodiments, an interactive communication system may determine the score for a particular dialog chunk using features obtained based, at least in part, on information in the dialog chunk and/or information associated with the dialog chunk. Examples of features include, but are not limited to, a feature indicating how well information provided by the caller in the particular dialog chunk, matches input that the ICS expected the caller would provide, a feature indicating that the caller requested assistance from a human operator, a feature indicating that the caller expressed dissatisfaction, a feature indicating a confidence in results of performing speech recognition on input provided by the caller, a feature indicating a confidence in results of performing natural language understanding on input provided by the caller, and a feature indicating an internal state of the ICS. The features may be provided as inputs to a statistical model that outputs the score for the dialog chunk. The statistical model may comprise an artificial neural network, a Gaussian mixture model, a support vector machine, and/or any other suitable statistical model.

In some embodiments, the interactive communication system may combine the scores determined for the dialog chunks of a call to obtain a likelihood that the caller is dissatisfied with the interactive communication system. The scores may be combined in any suitable way. For example, in some embodiments, the likelihood may be determined as a weighted average of the dialog chunks' scores. In some embodiments, the weights may be predetermined. In other embodiments, the weights may be determined based, at least in part, on information gathered during the call. For example, a weight for a score of a dialog chunk may itself be determined based, at least in part, on information in the dialog chunk and/or information associated with the dialog chunk. The weight may be determined using a neural network and/or any other suitable technique. These embodiments are described in more detail below with reference to FIG. 3.

In some embodiments, the scores for dialog chunks and their respective weights may be determined using a statistical model, sometimes referred to herein as a "cumulative predictor model." The sum of the dialog chunk scores in which the scores are weighted by their respective weights may be used to calculate the likelihood that the caller is dissatisfied with the interactive communication system.

In some embodiments, the cumulative predictor model may be configured to determine a score for a particular dialog chunk based on one or more features generated based on information in the particular dialog chunk and/or information associated with the particular dialog chunk. The cumulative predictor model may comprise a score predictor model (sometimes referred to herein as a "predictor function") configured to determine scores for dialog chunks. In some embodiments, the score predictor model may comprise a neural network.

In some embodiments, the cumulative predictor model may be configured to determine a weight for the score of the particular dialog chunk based on features derived from information in and/or associated with the particular dialog chunk and/or one or more other dialog chunks (e.g., one or more dialog chunks preceding the particular dialog chunk in the same call, one or more dialog chunks following the particular dialog chunk in the same call, or at least one dialog chunk preceding the particular dialog chunk and at least one dialog chunk following the particular dialog chunk in the call). In some embodiments, the cumulative predictor model may comprise a coefficient predictor model (sometimes referred to herein as a "coefficient function") configured to determine weights for dialog chunk scores. The coefficient predictor model may be implemented using a neural network. That neural network may be the same as or different from the neural network used to implement the above-described score predictor model described above.

In some embodiments, a cumulative predictor model may be trained using training data that includes multiple training examples. Each training example may be associated with a single call between a caller and the interactive communication system and may include information provided by the caller to the interactive communication system during the single call and/or information provided by the interactive communication system to the caller during the single call. The training example may be labeled with information indicating whether the caller was dissatisfied with the ICS system during (e.g., at the end of) the call. The cumulative predictor model may be trained by using the labeled training examples to estimate parameters of the cumulative predictor model. For example, the cumulative predictor model may comprise a score predictor model and a coefficient predictor model, and training the cumulative predictor model may comprise estimating parameters of the score predictor model and the coefficient predictor model. As a specific non-limiting example, the score predictor model may comprise a first neural network, the coefficient predictor model may comprise a second neural network, and training the cumulative predictor model may comprise using the labeled training data to estimate parameters of the neural networks.

It should be appreciated that the cumulative predictor model is not limited to being implemented using neural networks and may be implemented using any other suitable techniques, as aspects of the technology described herein are not limited in this respect. The cumulative predictor model is described in more detail below with reference to FIGS. 2-3 and in Sections 1-6.

It should also be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 shows a non-limiting illustrative environment 100 in which embodiments of the technology described herein may operate. In the illustrative environment, caller 102 may use any device 104 to conduct a call with interactive communication system (ICS) 108. A call between caller 102 and ICS 110 may be initiated in any suitable way. For example, caller 102 may initiate a call to ICS 108, the ICS may initiate a call to caller 102, the call may be initiated for caller 102 by another party such as by another ICS or by a customer call representative, etc. During a call with ICS 108, caller 102 may provide textual input, voice input, or a combination of textual input and voice input to ICS 108. ICS 108 may provide textual output, voice output, or a combination of textual output and voice output to caller 102 during a call.

In one embodiment, device 104 may be any suitable mobile device that caller 102 may use to communicate with ICS 108. For instance, mobile device 104 may be a mobile phone (e.g., a cellular phone), a mobile smart phone, a personal digital assistant (PDA), a laptop computer, a tablet computer, or any other mobile device capable of supporting a call through a communications medium (e.g., a wired or wireless communications medium). In other embodiments, caller 102 is not limited to making a call by using a mobile device and may use any device capable of supporting a call. For instance, caller 102 may communicate with ICS 108 by using a telephone connected to landline, a desktop computer connected to a network such as the Internet, or using any other device capable of communicating with ICS 108. It should also be recognized that if caller 102 participates in multiple calls with ICS 108, caller 102 is not limited to using the same device for all such calls. Thus, caller 102 may make multiple calls using one or a plurality of different devices, each of which may be any suitable device capable of supporting a call.

A call may be any suitable type of communication that supports voice and/or text-based communication among its participants. A call may enable a caller to communicate by allowing the caller to provide textual input and/or acoustic input. A call may also enable the caller to communicate by receiving textual output and/or acoustic output. As such, a call may enable purely text-based communication among participants in the call, purely voice-based communication among participants in the call, or a combination of text- and voice-based communication among participants in the call. For example, a call between a caller an interactive communication system may be a text-based call, whereby the caller provides text input (e.g., into a graphical user interface of the ICS) and the ICS provides text output to the caller. As another example, a call between a caller and an interactive communication system (e.g., an interactive voice response system) may be a voice-based call, whereby the caller provides voice input by speaking and the ICS provides acoustic output to the user. As yet another example, a call between a caller and the ICS may be a mixed modality call, whereby a caller may provide text and/or voice input and the ICS my provide text and/or voice output to the caller. Additionally or alternatively, a call may support other input modalities such as touch and video and/or other output modalities such as vibration (a form of touch output) and displaying of pictograms.

A call is not limited by the type of communications infrastructure or communications medium used to support the call. For example, a call may be a telephone call supported by using a public-switched telephone network, a wireless cellular network, or other telephone network. As another example, the call may be a VoIP call supported by a public (e.g., Internet) or private (e.g., corporate Intranet) network configured to support the Internet Protocol. As yet another example, the call may be a text-based chat supported by a public (e.g., Internet) or private (e.g., corporate Intranet) network configured to support the Internet Protocol.

In the illustrated embodiment, device 104 communicates with ICS 108 through a communication medium 106. Communication medium 106 may be any suitable network or other type of communication medium. For example, communication medium 106 may be a cellular network, a local area network, a circuit-switched telephone network, a public-switched telephone network, the Internet, some combination of any of the foregoing, or any other communication medium capable of supporting telecommunications.

Interactive communication system 108 comprises one or more computers (e.g., servers) each configured to perform processing related to supporting the functionality of the interactive response system. In the illustrated embodiment, ICS 108 comprises a single server, though in other embodiments any suitable number of servers may be used and distributed in any manner. For embodiments in which the ICS comprises multiple servers, the servers need not be located in the same physical location and may be distributed across multiple physical locations.

Interactive communication system 108 may be configured to support one or more ICS applications and may be configured to execute any other programs. For example, ICS 108 may be configured to execute programs for supporting functionality related to call management, dialog management, automated speech recognition (ASR), text-to-speech synthesis (TTS), natural language understanding, text processing, natural language generation, and/or any other functions used by an interactive communication system. In some embodiments, an interactive communication system 108 may be an interactive voice response system.

In some embodiments, ICS 108 may determine, during a call with caller 102, that caller 102 is dissatisfied with performance of the ICS. The interactive communication system 108 may make this determination in any of the ways described herein. For example, ICS 108 may determine a score for each of multiple portions (e.g., dialog chunks) of the call and obtain a likelihood that the caller is dissatisfied based on these scores. Regardless of how the ICS determines that a caller is dissatisfied with the way in which the call is progressing, upon making such a determination, the ICS 108 may perform one or more remedial actions to improve the caller's experience in an attempt to prevent the caller from becoming even more dissatisfied. For example, the ICS 108 may transfer the call to a human operator 112 who can handle the call via device 110 (which device may be of any suitable type). As another example, the ICS 108 may change the flow of the dialog (e.g., prompting the caller for additional information, presenting the caller with a different menu, asking the caller whether he would like to speak to a human operator, apologizing to the caller, etc.).

In the illustrated embodiment, device 104 is communicatively coupled to communication medium 106 via wireless connection 105a, device 110 is communicatively coupled to communication medium 106 via wired connection 105b, and ICS 108 is communicatively coupled to communication medium 106 using a wired connection 105c. This is merely for illustration, as device 104, device 110, and ICS 108 each may be communicatively coupled to communication medium 106 in any suitable way including wired and/or wireless connections.

Figure 2:
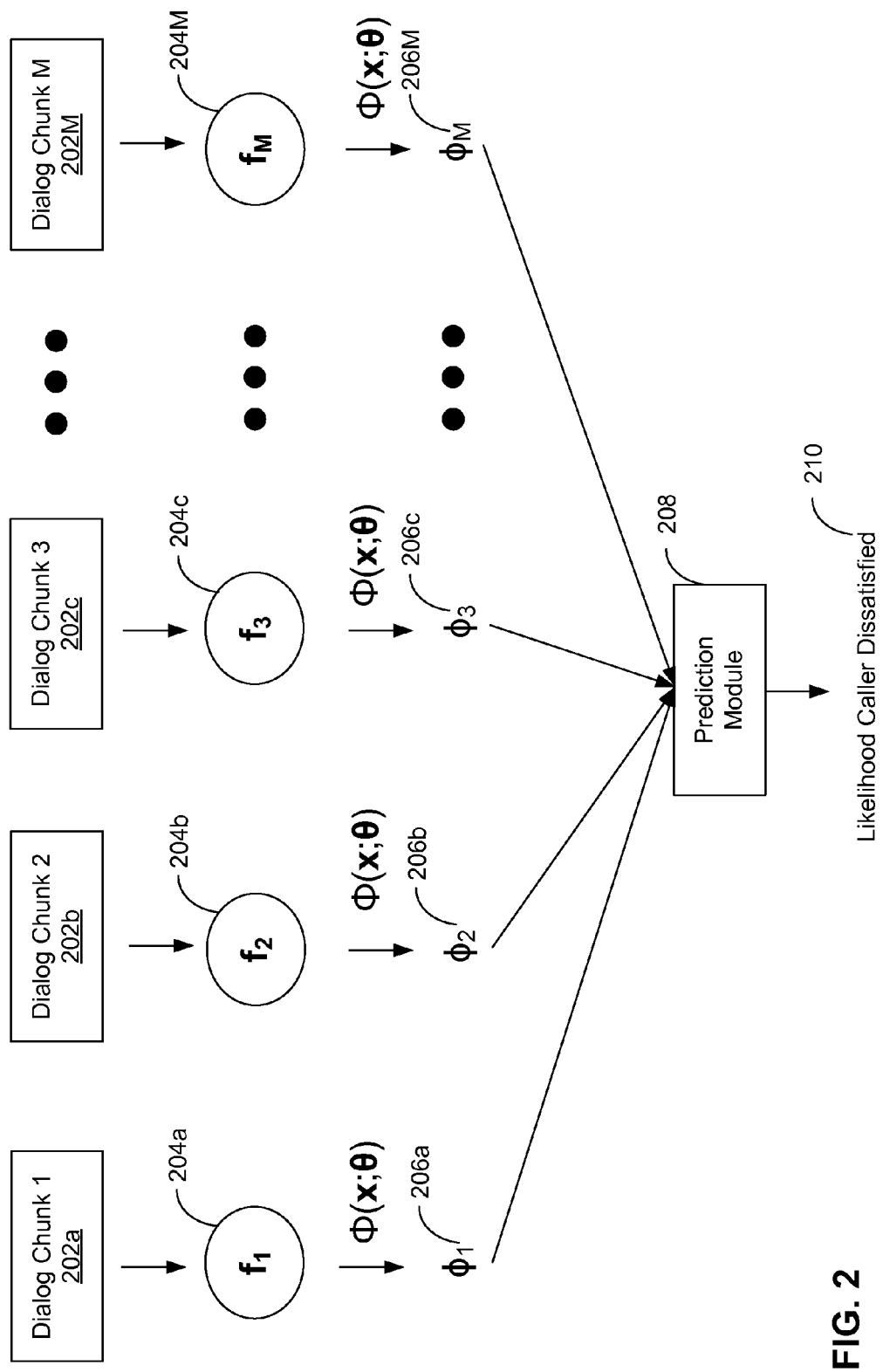
FIG. 2 is a diagram of an illustrative technique for predicting that a caller is dissatisfied with an interactive voice response system, in accordance with some embodiments of the technology described herein.

FIG. 2 is a diagram of an illustrative technique for predicting that a caller is dissatisfied with an interactive voice response system, in accordance with some embodiments of the technology described herein. The technique may be performed by an interactive communication system, such as ICS 108 described with reference to FIG. 1, any computing device(s) communicatively coupled to an ICS, or any other computing device(s).

As shown in the illustrative embodiment of FIG. 2, predicting that a caller is dissatisfied with an interactive communication system involves determining a likelihood 210 that the caller is dissatisfied with the interactive communication system. The likelihood 210 that the caller is dissatisfied with the interactive communication system may be determined at any particular time during a call between the caller and the interactive communication system. For example, the likelihood 210 may be obtained after a threshold amount of time passed from initiation of the call, after a threshold number of interactions between the caller and the interactive communication system have taken place, in response to the caller providing a particular input (e.g., pressing "0" or asking for an operator), and/or at any other suitable time.

In some embodiments, the likelihood that the caller is dissatisfied with the interactive communication system may be determined multiple times during a call. For example, the likelihood that a caller is dissatisfied with the interactive communication system may be determined after each input provided to the interactive communication system by the caller (or after every other input, every third input, etc.), after each output provided to the caller by the interactive communication system (or every other output, every third output, etc.), after each interaction between the caller and the interactive communication system in which the caller provides input to the interactive communication system and the interactive communication system provides output to the caller (or every other interaction, every third interaction, etc.), after a threshold amount of time elapses from the last time a determination was made as to the user's satisfaction with the interactive communication system, and/or at any other suitable times. In this way, subsequent determinations may take advantage of additional information obtained during the call as the call progresses. For example, when made after three interactions between the interactive communication system and the caller, the determination that a caller is dissatisfied with the interactive communication system may be performed at least in part by using information obtained during all three interactions. However, when made after four caller-ICS interactions, the determination that the caller is dissatisfied may be performed at least in part by using information during the first three interactions as well as any information obtained during the fourth interaction (e.g., by using additional input provided by the caller to the interactive communication system during the fourth interaction).

FIG. 2 illustrates determining whether a caller is dissatisfied with an interactive communication system at a point in a call between a caller and the ICS at which multiple interactions between the caller and the ICS have taken place. In particular, FIG. 2 illustrates obtaining the likelihood 210 that a caller is dissatisfied with the interactive communication system based, at least in part, on M multiple dialog chunks 202a, 202b, 202c, . . . , 202M, where each of the dialog chunks corresponds to a single interaction between the caller and the interactive communication system. FIG. 2 illustrates using four or more dialog chunks only for clarity of illustration and not by way of limitation. Accordingly, it should be appreciated that the likelihood 210 may be determined based on any suitable number of dialog chunks (e.g., one dialog chunk, two dialog chunks, three dialog chunks, four dialog chunks, etc.), as aspects of the technology described herein are not limited in this respect.

In some embodiments, a dialog chunk (e.g., dialog chunk 202a, 202b, 202c, and/or 202M) may include information provided by the caller to the interactive communication system during a single caller turn. For example, the caller may provide speech input during a single turn and the dialog chunk may include text obtained by performing automated speech recognition on the speech input provided by the caller. As another example, the caller may provide text input by pressing one or more keys (e.g., on a keypad or keyboard) during a single turn, and the dialog chunk may include information indicating what key(s) were pressed by the user. Information provided by the caller during a single caller turn may include any input provided by the caller prior to receiving output from the interactive communication system that is responsive to the input.

In some embodiments, a dialog chunk (e.g., dialog chunk 202a, 202b, 202c, and/or 202M) may include information provided to the caller by the interactive communication system in a single turn. For example, the ICS may provide acoustic output to the caller by playing pre-recorded or dynamically generated speech, and the dialog chunk may include text corresponding to the speech output to the caller. As another example, the ICS may provide textual output to the caller by outputting previously- or dynamically-generated text, and the dialog chunk may include the output text.

In some embodiments, additional information associated with one or more of the dialog chunks may be used for determining whether the caller is dissatisfied with the interactive communication system. Such additional information may be part of the dialog chunks, but may be stored separately from the dialog chunks. Examples of additional information associated with a dialog chunk include, but are not limited to, information indicating when the dialog chunk was obtained (e.g., a time when the caller provided caller input, a time when the interactive communication system provided the caller with output), information indicating the state of the interactive communication system in this part of the dialog (e.g., information indicating the dialog state of the interactive communication system during and/or at the end of the dialog chunks), information indicating the interactive communication system's level of confidence in the result of performing automated speech recognition on the user's speech input provided during the interaction to which the dialog chunk corresponds, a list of any alternative recognitions of the user's speech input (e.g., the N-best list), confidences associated with any alternative recognitions of the user's speech input, information indicating results of applying natural language understanding (NLU) techniques to the user's input (e.g., results of applying NLU techniques to text obtained by performing ASR on the user's speech input), and information indicating the interactive communication system's level of confidence in results of applying NLU techniques to the user's input.

As shown in the embodiment illustrated in FIG. 2, multiple feature sets 204a, 204b, 204c, . . . 204M (also labeled $f_1, \ldots, f_M$) are then generated based on respective dialog chunks 202a, 202b, 202c, . . . 202M. For example, feature set 204a may be generated based on information in dialog chunk 202a and/or any information associated with dialog chunk 202a, examples of which information are described above. Similarly, feature sets 204b, 204c, and 204M, may be generated based on information in and/or associated with dialog chunks 202b, 202c, and 202M, respectively. The features may be generated in any suitable way, as aspects of the technology described herein are not limited in this respect.

A feature set (e.g., feature set 204a, 204b, 204c, or 204M) may include any suitable feature generated based on information in and/or associated with the dialog chunk to which the feature set corresponds. For example, a feature set (e.g., feature set 204a) corresponding to a particular dialog chunk (e.g., dialog chunk 202a) may include one or more features indicating that one or more particular keywords were input by the caller, at least a portion of text obtained by recognizing speech input by the caller, one or more alternative recognitions of speech input by the caller, confidences associated with any recognitions of speech input by the caller, one or more features indicating how well information provided by the caller in the particular dialog chunk matches input that the interactive communication system expected the caller would provide, one or more features indicating that the caller requested assistance from a human operator, a feature indicating that the caller expressed dissatisfaction, one or more features indicating results of performing NLU on input provided by the caller and/or any confidences associated with the NLU results, one or more features indicating the internal state(s) of the interactive communication system, and/or any other suitable features. Each feature set may include any suitable number of features (e.g., one, two, three, at least five, between one and 15), as aspects of the technology described herein are not limited in this respect.

Next, each of the feature sets 204a, 204b, 204c, . . . , 204M may be processed to obtain a respective score 206a, 206b, 206c, . . . , 206M. These scores are also denoted $\varphi_1, \varphi_2, \varphi_3, \ldots, \varphi_M$. Each score may provide an indication of the caller's dissatisfaction (if any) with the interactive communication system during a corresponding dialog chunk because the score is determined based on a feature set obtained using information in and/or associated with the dialog chunk. For example, scores 206a, 206b, 206c, . . . , 206M may provide measures of the caller's dissatisfaction with the interactive communication system during dialog chunks 202a, 202b, 202c, and 202M. In some embodiments, each score may be a single value. However, aspects of the technology described herein are not limited in this respect, and in some embodiments each score may comprise multiple values. That is, in some embodiments, a score may be a vector of values.

A score for a particular dialog chunk may provide a measure of the caller's dissatisfaction (if any) with the interactive communication system at any point in the interaction between the caller and the interactive communication system to which the particular dialog chunk corresponds. For example, a score for a dialog chunk may provide a measure of the caller's dissatisfaction at the end of the interaction to which the dialog chunk corresponds (e.g., after the caller has provided input to the interactive communication system and the interactive communication system has provided output to the caller responsive to the caller's input). As another example, the score for a dialog chunk may provide a measure of the caller's dissatisfaction at a point during the interaction (e.g., after the caller has provided input to the interactive communication system, but before the ICS has provided any output to the caller responsive to the caller's input). However, in some embodiments, a score for a particular dialog chunk need not itself provide a measure of the caller's dissatisfaction with an interactive communication system. Rather, the measure of the caller's dissatisfaction may be provided as a function of scores for multiple dialog chunks.

In some embodiments, a score for a dialog chunk may be determined by using the feature set corresponding to the dialog chunk as input to a score predictor statistical model, sometimes called a predictor function herein and denoted by $\Phi(x;\theta)$, where x and $\theta$ denote, respectively, the input and parameters of the score predictor statistical model or predictor function. The score predictor model may compute the score for a dialog chunk based on the values of the features in the feature set corresponding to the dialog chunk. For example, the score predictor model may be used to compute score 206a based on the values of the features in feature set 204a corresponding to dialog chunk 202a.

In some embodiments, the score predictor model may comprise a neural network. The neural network may be a recurrent neural network, a multi-layer neural network, a convolutional neural network, a deep neural network, and/or any other suitable type of neural network. Though it should be appreciated that the score predictor model is not limited to being implemented using neural networks and may be implemented using any suitable statistical model (e.g., graphical model, Gaussian mixture model, support vector machine, etc.), as aspects of the technology described herein are not limited in this respect.

As shown in the illustrative embodiment of FIG. 2, prediction module 208 may obtain (e.g., calculate) likelihood 210 that the caller is dissatisfied with the interactive communication system based on the individual scores (i.e., scores 206a, 206b, 206c, . . . , 206M) of the dialog chunks. This may be done in any suitable way. For example, the likelihood 210 may be calculated as the average of the scores of the dialog chunks. In this way, the scores of all the dialog chunks are weighted equally. As another example, the likelihood 210 may be calculated as a weighted average of the dialog chunk scores, whereby the dialog chunks scores are not equally weighted. This is described in more detail below.

In some embodiments, the dialog chunk scores for dialog chunks of a call may be weighted by weights that do not depend on any data obtained during the call. For example, the dialog chunk scores corresponding to dialog chunks obtained later in the call may be assigned weights that are larger than the dialog chunk scores corresponding to dialog chunks obtained earlier in the call. This may be done in any suitable way. As one example, the weights for dialog scores may increase linearly with time such that dialog chunk scores for earlier dialog chunks are smaller than the dialog chunk scores for dialog chunks obtained later in the call. As another example, the weights for dialog scores may increase exponentially with (or in accordance with any other suitable monotonically non-decreasing function of) time such that dialog chunk scores for earlier dialog chunks are smaller than the dialog chunk scores for dialog chunks obtained later in the call. In some instances, a truncation scheme may be used whereby a weight of zero is assigned to one or more dialog chunks (e.g., one or more earlier dialog chunks, one or more dialog chunks obtained at least a threshold number of chunks earlier than the most recent dialog chunk, etc.) such that their score does not influence the value of likelihood 210 calculated based on the scores.

In other embodiments, the dialog chunk scores for dialog chunks of a call may be weighted according to weights that depend on the data obtained during the call. In such embodiments, one or more of the weights may be determined, during the call, based on information in one or more dialog chunks and/or associated with one or more dialog chunks. For example, the likelihood 210, denoted by L, may be obtained as the following weighted combination of dialog chunk scores $\varphi_1, \varphi_2, \varphi_3, \ldots, \varphi_M$:

$$L = \lambda_1 \varphi_1 + \lambda_2 \varphi_2 + \lambda_3 \varphi_3 + \ldots + \lambda_M \varphi_M,$$

where $\lambda_1, \lambda_2, \lambda_3, \ldots, \lambda_M$ are weights corresponding to the dialog chunk scores $\varphi_1, \varphi_2, \varphi_3, \ldots, \varphi_M$. As described above, the dialog chunk scores may be determined based, at least in part, on information in and/or associated with dialog chunks 202a, 202b, 202c, . . . , and 202M. Additionally, the weights $\lambda_1, \lambda_2, \lambda_3 \ldots \varphi_M$ also may be determined based on information in and/or associated with these dialog chunks. This allows the dialog scores to be weighted adaptively, based on what transpired during the call, to determine the likelihood that a caller is dissatisfied with the interactive communication system. Determining the dialog chunk score weights based on information obtained during the call is described further with reference to FIG. 3 below.

Regardless of the manner in which likelihood 210 is computed, once it is obtained it may be used to determine whether to perform a remedial action to improve the caller's experience. For example, when the likelihood 210 exceeds a threshold, it may be determined that a remedial action is to be performed. Examples of remedial actions include, but are not limited to, transferring the call to a human operator, changing the dialog plan according to which the interactive communication system is interacting with the caller during the call, apologizing to the caller, and/or performing any other suitable remedial action.

Figure 3:
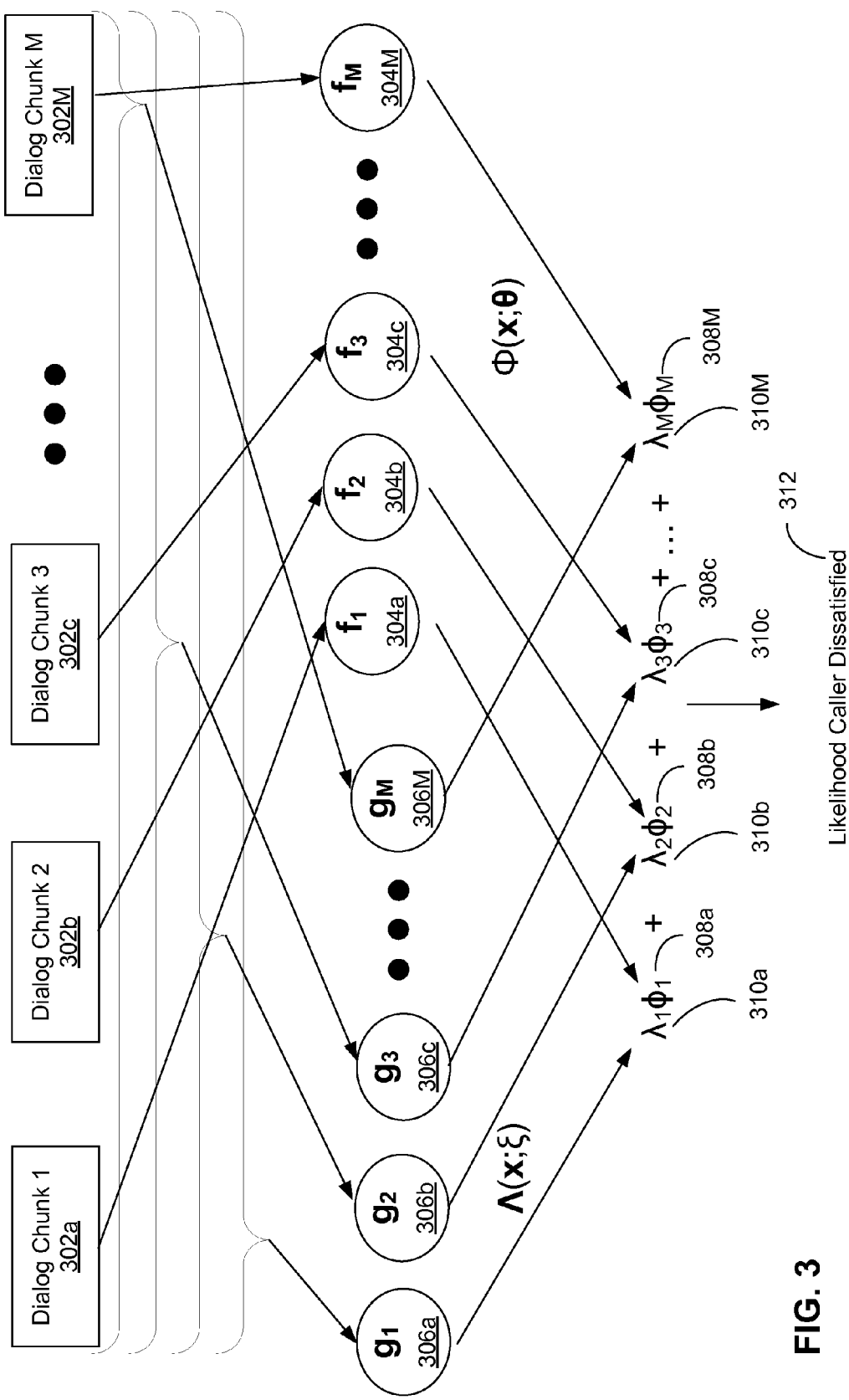
FIG. 3 is a diagram of another illustrative technique for predicting that a caller is dissatisfied with an interactive voice response system, in accordance with some embodiments of the technology described herein.

FIG. 3 is a diagram of another illustrative technique for determining whether a caller is dissatisfied with an interactive voice response system, in accordance with some embodiments of the technology described herein. The technique may be performed by an interactive communication system, such as interactive communication system 108 described with reference to FIG. 1, any computing device(s) communicatively coupled to an interactive communication system, or any other computing device(s).

The technique illustrated in FIG. 3 is one example of how the technique illustrated in FIG. 2 may be implemented. In particular, FIG. 3 illustrates a technique for obtaining a likelihood 312 that a caller is dissatisfied with an interactive communication system as a weighted linear combination of dialog chunk scores, in which the dialog chunk scores and their respective weights are both determined based on information obtained during the call. As may be appreciated from the foregoing discussion, the likelihood 312 that the caller is dissatisfied with the interactive communication system may be determined at any particular time or times during a call between the caller and the interactive communication system. Examples of times when a likelihood that a caller is dissatisfied with the interactive communication system may be determined are described above.

FIG. 3 illustrates determining whether a caller is dissatisfied with an interactive communication system at a point in a call between a caller and the ICS at which multiple interactions between the caller and the interactive communication system have taken place. In particular, FIG. 3 illustrates obtaining the likelihood 312 that a caller is dissatisfied with the interactive communication system based, at least in part, on M multiple dialog chunks 302a, 302b, 302c, . . . , 302M, where each of the dialog chunks corresponds to a single interaction between the caller and the interactive communication system. FIG. 3 illustrates using four or more dialog chunks only for clarity of illustration and not by way of limitation. Accordingly, it should be appreciated that the likelihood 312 may be determined based on any suitable number of dialog chunks (e.g., one dialog chunk, two dialog chunks, three dialog chunks, four dialog chunks, etc.), as aspects of the technology described herein are not limited in this respect.

A dialog chunk (e.g., dialog chunk 302a, 302b, 302c, and/or 302M) may include information provided by the caller to the interactive communication system during a single caller turn and/or information provided to the caller by the interactive communication system in a single turn. Examples of such information are described above. Additional information associated with one or more of the dialog chunks (examples of which are described above) may also be used for determining whether a caller is dissatisfied with an interactive communication system.

As shown in the embodiment illustrated in FIG. 3, feature sets 304a, 304b, 304c, . . . , 304M (also labeled $f_1, \ldots, f_M$) are generated based on information in and/or associated with respective dialog chunks 302a, 302b, 302c, . . . 302M. A feature set (e.g., feature set 304a, 304b, 304c, or 304M) may include any suitable feature(s) generated based on information in and/or associated with the dialog chunk to which the feature set corresponds. The generated feature sets 304a, 304b, 304c, . . . , 304M may include any suitable features, examples of which are described herein. Each feature set may include any suitable number of features (e.g., one, two, three, at least five, between one and 15), as aspects of the technology described herein are not limited in this respect.

The generated feature sets 304a, 304b, 304c, . . . , 304M are in turn processed to obtain dialog chunk scores 308a, 308b, 308c, . . . , 308M (also denoted by $\varphi_1, \varphi_2, \varphi_3, \ldots, \varphi_M$). Each dialog chunk score may provide an indication of the caller's dissatisfaction with the interactive communication system during a corresponding dialog chunk because the score is determined based on a feature set obtained using information in and/or associated with the dialog chunk. A dialog chunk score for a dialog chunk may be obtained by applying the feature set obtained from the dialog chunk as input to a score predictor statistical model that computes the score for a dialog chunk based on the input. The score predictor model may comprise a neural network (of any suitable type, examples of which are provided herein) or any other suitable statistical model.

Also, as shown in the embodiment illustrated in FIG. 3, feature sets 306a, 306b, 306c, . . . , 306M (also labeled $g_1, \ldots, g_M$) are generated based on information in and/or associated with dialog chunks 302a, 302b, 302c, . . . 302M. Each of the feature sets 306a, 306b, 306c, . . . , 306M may be generated based on information in any of the dialog chunks 302a, 302b, 302c, . . . 302M. For example, feature set 306c may be generated based on information in and/or associated with all the available dialog chunks (i.e., dialog chunks 302a, 302b, 302c, . . . , 302M), as illustrated with the underbraces in FIG. 3. As another example, feature set 306c may be generated based on information in and/or associated only with its respective dialog chunk 306c. As yet another example, feature set 306c may be generated based on information in and/or associated with all dialog chunks preceding including its respective dialog chunk (i.e., dialog chunks 306a, 306b, and 306c). Accordingly, it should be appreciated that feature sets $g_1, \ldots, g_M$ may be different from the feature sets $f_1, \ldots, f_M$ (e.g., feature set $g_1$ may have a different number of features than feature set $f_1$, a feature may take on different values in feature sets $g_1$ and $f_1$, etc.). Though, in some embodiments, feature sets $g_1, \ldots, g_M$ may be the same as the feature sets $f_1, \ldots, f_M$. The generated feature sets 306a, 306b, 306c, . . . , 306M may include any suitable features, examples of which are described herein. Each feature set may include any suitable number of features (e.g., one, two, three, at least five, between one and 15), as aspects of the technology described herein are not limited in this respect.

The generated feature sets 306a, 306b, 306c, . . . , 306M are in turn processed to obtain dialog chunk score weights 310a, 310b, 310c, . . . , 310M (also denoted by $\lambda_1, \lambda_2, \lambda_3, \ldots, \lambda_M$). A dialog chunk score for a dialog chunk may be obtained by applying the feature set obtained from the dialog chunk as input to a coefficient predictor statistical model that computes a weight for a dialog chunk score based on the input. The coefficient predictor statistical model is sometimes referred to here as a "coefficient function" herein and denoted by $\Lambda(x;\xi)$ where $x$ and $\xi$ denote, respectively, the input and parameters of the coefficient predictor statistical model or coefficient function.

In some embodiments, the coefficient predictor statistical model may comprise a neural network. The neural network may be a recurrent neural network, a multi-layer neural network, a convolutional neural network, a deep neural network, and/or any other suitable type of neural network. Though it should be appreciated that the coefficient predictor model is not limited to being implemented using neural networks and may be implemented using any suitable statistical model (e.g., graphical model, Gaussian mixture model, support vector machine, etc.), as aspects of the technology described herein are not limited in this respect.

Accordingly, in some embodiments, the likelihood 312 that a caller is dissatisfied with the interactive communication system may be obtained by using two different statistical models: a score predictor model used to obtain dialog chunk scores and a coefficient predictor model used to obtain weights for the dialog chunk scores. These two models may be trained jointly such that their respective parameters are estimated jointly using the same set of training data, as described in more detail below. The two models may also be referred to together as a cumulative predictor statistical model.

Figure 4:
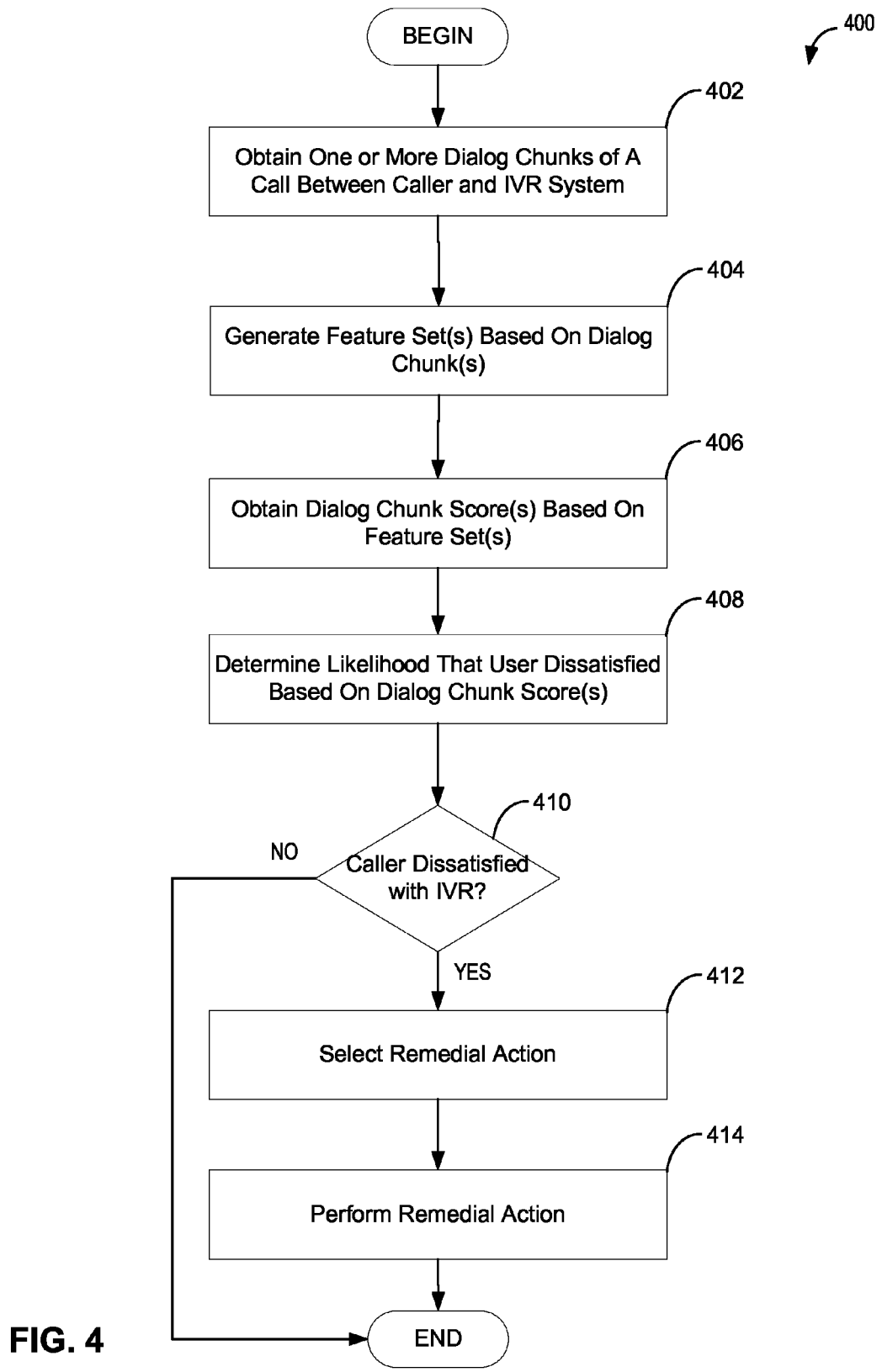
FIG. 4 is a flowchart of an illustrative process for conducting a call between a caller and an interactive voice response system, in accordance with some embodiments of the technology described herein.

FIG. 4 is a flowchart of an illustrative process 400 for conducting a call between a caller and an interactive communication system, in accordance with some embodiments of the technology described herein. Process 400 may be performed by any suitable interactive communication system (e.g., ICS 108 described with reference to FIG. 1) or any other suitable computing device(s).

Process 400 begins at act 402, where one or more dialog chunks of a call between a caller and an interactive communication system are obtained. Each dialog chunk may include information obtained during a single interaction between the call and the interactive communication system. For example, a dialog chunk obtained at act 402 may include information provided by the caller to the interactive communication system during a single caller turn and/or information provided to the caller by the interactive communication system in a single turn. Examples of such information are described above. Additionally, information associated with one or more of the dialog chunks (examples of which are described above) may also be obtained at act 402. Any suitable number of dialog chunks may be obtained at act 402, as aspects of the technology described herein are not limited in this respect.

Next, process 400 proceeds to act 404, where a respective feature set is generated for each of the dialog chunks obtained at act 402. A feature set for a particular dialog chunk may be generated based on information contained in the dialog chunk and/or information associated with the dialog chunk. The feature set may contain any suitable features including one or more features indicating that one or more particular keywords were input by the caller, at least a portion of text obtained by recognizing speech input by the caller, one or more alternative recognitions of speech input by the caller, confidences associated with any recognitions of speech input by the caller, one or more features indicating how well information provided by the caller in the particular dialog chunk matches input that the interactive communication system expected the caller would provide, one or more features indicating that the caller requested assistance from a human operator, a feature indicating that the caller expressed dissatisfaction, one or more features indicating results of performing NLU on input provided by the caller and/or any confidences associated with the NLU results, one or more features indicating the internal state(s) of the interactive communication system, and/or any other suitable features. Each feature set may include any suitable number of features (e.g., one, two, three, at least five, between one and 15), as aspects of the technology described herein are not limited in this respect.

Next, process 400 proceeds to act 406, where a dialog chunk score is determined for each dialog chunk obtained at act 402. The score for a particular dialog chunk may be obtained by applying the feature set obtained based on information in and/or associated with the dialog chunk as input to a score predictor statistical model. The score predictor statistical model calculates the dialog chunk score based on the input feature set. In some embodiments, the score predictor statistical model may be implemented using a neural network (of any suitable type including any of the types of neural networks described herein) or any other suitable statistical model.

Next, process 400 proceeds to act 408, where the dialog chunk scores determined for the dialog chunks obtained at act 402 are combined to determine a likelihood that the caller is dissatisfied with the interactive communication system. The dialog chunk scores may be combined to determine the likelihood in any suitable way. For example, the likelihood may be determined as a weighted linear combination of the dialog chunk scores. In some embodiments, the weights in the weighted linear combination of dialog scores may be independent of any information obtained during the call and may have been determined prior to the start of the call.

In other embodiments, the weights in the weighted linear combination of dialog scores may depend on information obtained during the call. For example, in some embodiments, the weights may be determined based on information in and/or associated with the dialog chunks obtained at act 402 of process 400. As described with reference to FIG. 3, another group of feature sets (different from the feature sets obtained at act 404) may be obtained based on the dialog chunks obtained at act 402. In turn, each of the feature sets in this group may be used to determine a weight for a respective dialog chunk score. For example, a feature set may be provided as input to a coefficient predictor statistical model. The coefficient predictor statistical model calculates the dialog chunk score weight based on the input feature set. In some embodiments, the score predictor statistical model may be implemented using a neural network (of any suitable type including any of the types of neural networks described herein) or any other suitable statistical model. In some embodiments, the coefficient predictor statistical model and the score predictor models may be realized using different neural networks. In other embodiments the coefficient predictor model and the score predictor models may be realized using the same neural network.

Next, process 400 proceeds to decision block 410, where it is determined whether the caller is dissatisfied with the interactive communication system. In some embodiments, the determination is made by comparing the likelihood obtained at act 408 with a threshold. When the likelihood does not exceed a threshold, it may be determined that the caller is not dissatisfied with the interactive communication system (or at least not sufficiently dissatisfied to warrant remedial action) and the process completes.

On the other hand, when the likelihood exceeds a threshold, it may be determined that the caller is dissatisfied with the interactive communication system and process 400 proceeds, via the YES branch, to acts 412 and 414 where a remedial action is selected and performed, respectively, to improve the caller's experience. Any suitable remedial action may be selected at act 412, examples of remedial actions are described herein. In some instances, the remedial action may be selected based on a degree of the caller's dissatisfaction. For example, if the caller is very dissatisfied (e.g., as may be indicated by a likelihood much higher than a threshold), the interactive communication system may elect to transfer the call to a human operator. On the other hand, if the caller is only somewhat dissatisfied (e.g., as may be indicated by a likelihood only slightly higher than the threshold), the interactive communication system may elect to continue interacting with the caller by adjusting its dialog plan or apologizing, but not transferring the call to a human operator. After the selected remedial action is performed at act 414, process 400 completes.

As may be appreciated from the foregoing, the likelihood that a caller is dissatisfied with an interactive communication system may be obtained based on outputs of one or more statistical models: the score prediction statistical model and, in embodiments where the weights of dialog chunk scores are determined based on information obtained during a call, the coefficient prediction statistical model.

As described above, the score prediction statistical model and the coefficient prediction statistical model may be trained, before being used in practice to help service calls between callers and interactive communication systems, using labelled training data. Each training example in the training data may be associated with a single call between a caller and the interactive communication system and may include information in and/or associated with the dialog chunks in the single call. Each training example may also be labeled with information indicating whether the caller was dissatisfied with the interactive communication system during (e.g., at the end of) the call. The training examples may have different lengths (some callers became dissatisfied quickly after a small number of interactions, whereas other callers took longer to become dissatisfied or perhaps were satisfied with the quality of the call). The training examples may be used to estimate parameters of the score prediction and coefficient prediction models. This may be done using any suitable objective function including those described in Section 3 below. When the score prediction and coefficient prediction models are realized using neural networks, a backpropagation training technique may be used to estimate parameters of the neural networks, as described in more detail below in Section 5.

Figure 5:
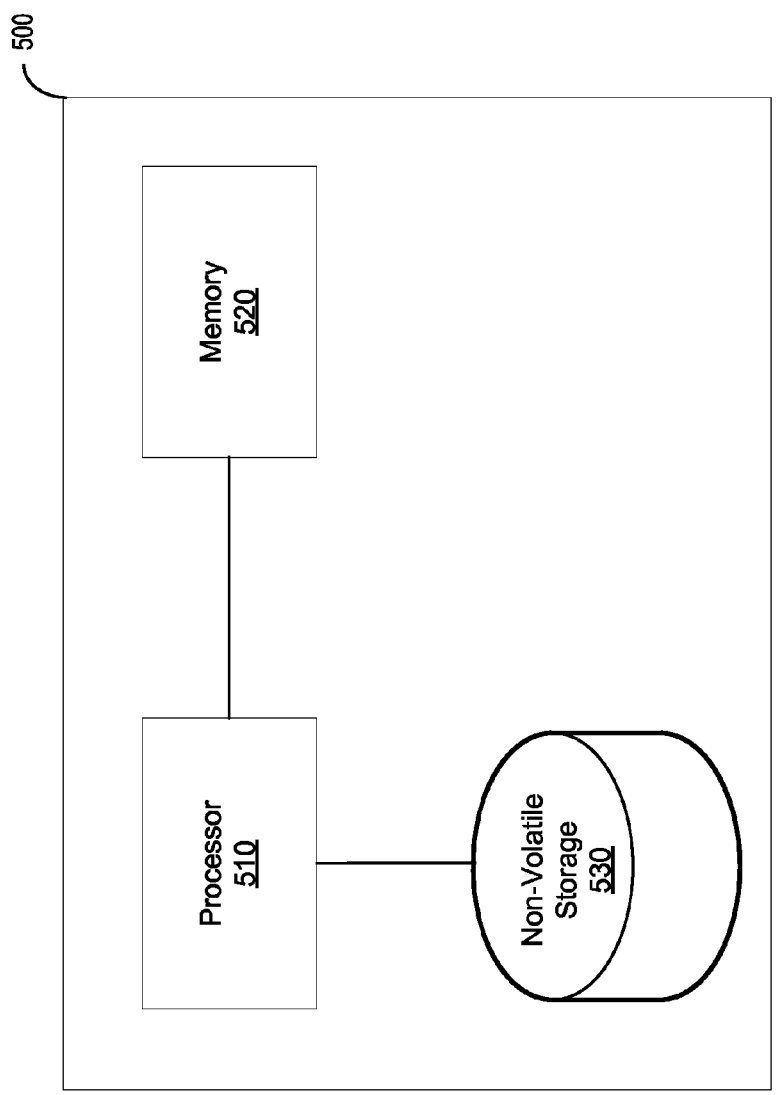
FIG. 5 is a block diagram of an illustrative computer system that may be used in implementing some embodiments.

An illustrative implementation of a computer system 500 that may be used in connection with any of the embodiments of the disclosure provided herein is shown in FIG. 5. The computer system 500 may include one or more processors 510 and one or more articles of manufacture that comprise non-transitory computer-readable storage media (e.g., memory 520 and one or more non-volatile storage media 530). The processor 510 may control writing data to and reading data from the memory 520 and the non-volatile storage device 530 in any suitable manner, as the aspects of the disclosure provided herein are not limited in this respect. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

Some aspects of the technology described herein may be understood further based on the non-limiting illustrative embodiments described below in Sections 1-7. Any limitations of the embodiments described below in Sections 1-7 are limitations only of the embodiments described in Sections 1-7, and are not limitations of any other embodiments described herein.

Contents

1 Notation — 25
  1.1 Basic Conventions — 25
  1.2 Data Representation — 26
  1.3 Cumulative Predictor Model Components — 28

2 Cumulative Predictor Model Definition — 33

3 Training a Cumulative Predictor Model — 34
  3.1 Objective Function — 34
  3.2 Standard Activation and Loss Functions — 35
  3.3 Optimization — 36
    3.3.1 General Case - Coefficient and Predictor Functions Share the Same Parameters — 37
    3.3.2 Disjoint Case - Parameters of Coefficient Functions are Disjoint from Parameters of Predictor Functions — 37

4 Runtime Usage of a Cumulative Predictor Model — 38

5 Implementing Cumulative Predictor Model using Artificial Neural Networks — 38

6 Augmenting Training Data with Derived Training Examples — 40
  6.1 Example Task — 40
  6.2 Task-specific Loss Functions for Derived Training Examples — 41
  6.3 Task-specific Derived Training Examples — 42

7 Straightforward Generalizations of Cumulative Predictor Model — 43

1 Notation

In this section we introduce notation for data and for components of the Cumulative Predictor model.

1.1 Basic Conventions

The basic notational conventions that we use are as follows: A boldface type indicates a vector or a sequence. When a variable is indexed by multiple indices and at least one of the indices is a complex expression, for clarity we use commas to separate the individual indices. We use superscripts to indicate to which training example a given value relates. We indicate dependence of a function on parameters that are to be learned (using optimization) by placing the parameters after a vertical bar; we drop this explicit notation of dependence on parameters to avoid clutter when no confusion can possibly arise. We use the symbol $\equiv$ when introducing new notation.

1.2 Data Representation

We assume that data, in order to be amenable to be used with the proposed Cumulative Predictor method described in this document, can be represented as discrete "chunks" and that these chunks can be ordered into a sequence; typically such data will have some temporal or spacial aspect allowing us to discretize ("chop") them into a sequence. Note that we only require that data can be chopped into discrete chunks, with no further requirements; for example, data chunks may cover overlapping parts of the original data (corresponding to a "sliding window" view of the original data). In the sequel we abstract from how we obtain a representation of the original data in the form of sequences of data chunks, and treat data as formed by sequences of elements.

A *training example* is a pair consisting of a finite input sequence and a target $(\boldsymbol{d}, \boldsymbol{t})$, where we use the following notation for sequences $$\boldsymbol{d} = \langle d_1, d_2, \ldots, d_M \rangle. \tag{1}$$

For ease of exposition and to avoid clutter, we assume that the target $\boldsymbol{t}$ is associated with the last element of the input sequence, $d_M$. It is straightforward to generalize our exposition to other settings (target associated with other than the last element of an input sequence, multiple targets associated with different elements of the input sequence). We also use the term *sparsely labeled sequence* in this more general sense, that is to mean an input sequence with one or more targets associated with different elements of the sequence.

> One possible way of converting a dialogue between a user and a dialogue system into the form of an element sequence is to treat each exchange consisting of a user turn (user input) and the following system turn (system response) as a single element. (If the system produces a "welcome" prompt at the start of a dialogue, such a system turn may be either treated as a separate exchange, or the first exchange may be considered as formed by a system welcome prompt, user input and a system response.) Discretizing a dialogue into such "exchange" units is natural from the dialogue system point of view — we assume that the dialogue system "plans" its next action (or sequence of actions for its turn) based on a user input, and therefore the action plan is available before it is carried out by the system, and therefore the plan can be used by the dialogue system as input to a model detecting whether the particular dialogue is going wrong, and possibly take remedial action instead of the action originally planned.

Target $t$ is a vector of real values $(t_1, t_2, \ldots, t_K)$ of length $K$, $K \geq 1$; that is, $t \in \mathbb{R}^K$. This general vector form allows for encoding targets for regression and classification settings (for example, targets for multi-class classification can be encoded using so-called 1-of-$K$ encoding).

A target label may be an indication of a level of badness at a particular point in a dialogue. We will assume that at most one element per dialogue is labeled (this assumption might very well be warranted given the cost of annotation).

*Training data* consist of training examples $$T = \{(d^1, t^1), (d^2, t^2), \ldots, (d^N, t^N)\}.$$

We use superscript $n = 1, 2, \ldots, N$ to denote components of individual training examples, $N$ denotes the size of the training data set.

We allow for training examples to have input sequences of different lengths, therefore for the $n$-th training example $(d^n, t^n)$ in $T$ we denote its input sequence as $d^n = \langle d_1^n, d_2^n, \ldots, d_{M_n}^n \rangle$, where $M_n$ is the length of the input sequence in the training pair.

Our example task is on-the-fly detection of dialogues going wrong, therefore we will assume that dialogues that have been annotated as bad at some point in the dialogue are truncated right after that point. Explicitly, we assume that our training data consist of training examples having one of the following two forms:
- input sequences formed from whole "completely OK" dialogues, associated with the corresponding label
- for "bad" dialogues, input sequences formed from only their initial parts up to and including the points where they have been annotated as bad, associated with corresponding labels indicating levels of badness We assume that all input sequence elements $d_m^n$ come from some *domain* set denoted as $\mathcal{D}$.

We assume that all targets have the same dimension $K$, that is $t^n \in \mathbb{R}^K$ for all $n = 1, 2, \ldots, N$.

1.3 Cumulative Predictor Model Components

We denote by $f(d)$ a *predictor feature function* that for all elements $d \in \mathcal{D}$ computes a vector of real-valued features, that is $$f : \mathcal{D} \to \mathbb{R}^p \qquad (2)$$

for some fixed positive integer $p$.

> Features that can be extracted from a user-system exchange include, but are not limited to: how well user input matches system expectations (its internal state), is there any indication that the user is requesting help or expressing dissatisfaction, internal state of the dialogue system, including internal state specific for the particular dialogue application executed by the dialogue system, et cetera.

We denote by $g(d, h)$ a *coefficient feature function* that for a sequence of elements $d = \langle d_1, d_2, \ldots, d_M \rangle$, $d_i \in \mathcal{D}$ for $i = 1, 2, \ldots, M$, and an integer $h$ such that $0 \leq h < M$, computes a vector of real-valued features, that is $$g : \bigcup_{j=1}^{\infty} \left( \mathcal{D}^j \times \{0, 1, \ldots, j-1\} \right) \to \mathbb{R}^q \qquad (3)$$

for some fixed positive integer $q$. We use the second argument of $g$ to indicate a position in the sequence $d$ counting backwards from the last element in the sequence. (See below where we introduce predictor and coefficient functions.)

> Simple features that disregard the actual "content" of the element sequences include the values $h$ and $M$, which can be used as inputs for history decay, history truncation, and accumulation averaging, among others. More complex features may be derived from patterns in the input element sequence, such as the repetition of the same internal state, system action, or user input in the history (among the previous element of the input sequence).

For clarity of exposition, we assume that the predictor feature function $f$ and the coefficient feature function $g$ are fixed for a particular instance of the Cumulative Predictor model, therefore we treat them as given in what follows.

We assume that for each $k = 1, 2, \ldots, K$ we have a parametrized *predictor function* (that is, we have a predictor function for every component of a target vector)

$$\Phi_k(x \mid \boldsymbol{\theta}_k) : \mathbb{R}^p \to \mathbb{R}, \qquad (4)$$

where $\boldsymbol{\theta}_k \in \mathbb{R}^{r_k}$ is the vector of parameters of $\Phi_k$ (we denote $\theta_{ki}$, $i = 1, 2, \ldots, r_k$, the components of $\boldsymbol{\theta}_k$); we assume that $\Phi_k$ is differentiable with respect to $\boldsymbol{\theta}_k$. We use predictor functions $\Phi_k$ as "pointwise" functions whose values contribute to estimated values corresponding to components of targets, evaluated on individual elements from an input sequence (see (9) below).

We use the following shorthand notation for predictor functions applied to elements of an input sequence $\boldsymbol{d} = \langle d_1, d_2, \ldots, d_M \rangle$ $$\varphi_{km} \equiv \Phi_k\left(\boldsymbol{f}(d_m) \mid \boldsymbol{\theta}_k\right), \tag{5}$$

where $k = 1, 2, \ldots, K$ and $m = 1, 2, \ldots, M$. When we consider an input sequence $\boldsymbol{d}^n = \langle d_1^n, d_2^n, \ldots, d_{M_n}^n \rangle$ from a training example $(\boldsymbol{d}^n, \boldsymbol{t}^n)$, we use superscript $n$ to indicate it, that is $\varphi_{km}^n \equiv \Phi_k\left(\boldsymbol{f}(d_m^n) \mid \boldsymbol{\theta}_k\right)$.

Artificial neural networks form a general class of function approximators, so we will assume that also in the case of the task of detecting dialogues going wrong we use artificial neural networks to implement predictor functions. Section 5 provides details on implementing predictor functions using artificial neural networks.

We assume that for each $k = 1, 2, \ldots, K$ we have a parametrized *coefficient function* (that is, we have a coefficient function for every component of a target vector)

$$\Lambda_k(\boldsymbol{x} \mid \boldsymbol{\xi}_k) : \mathbb{R}^q \to \mathbb{R}, \tag{6}$$

where $\boldsymbol{\xi}_k \in \mathbb{R}^{s_k}$ is the vector of parameters of $\Lambda_k$ (we denote $\xi_{ki}$, $i = 1, 2, \ldots, s_k$, the components of $\boldsymbol{\xi}_k$); we assume that $\Lambda_k$ is differentiable with respect to $\boldsymbol{\xi}_k$.

We use the following shorthand notation for the values of coefficient functions applied to an input sequence $\boldsymbol{d} = \langle d_1, d_2, \ldots, d_M \rangle$ and a position in the sequence (counting backwards from the last element, starting from zero)

$$\lambda_{kh} \equiv \Lambda_k\left(\boldsymbol{g}(\boldsymbol{d}, h) \mid \boldsymbol{\xi}_k\right), \tag{7}$$

where $k = 1, 2, \ldots, K$ and $h = 0, 1, \ldots, M - 1$.

We have introduced predictor and coefficient functions as single-valued parametric functions. Note, however, that vector-valued functions can be used to implement arbitrary sets of such functions — for example, a single $K$-vector-valued function can implement all predictor functions.

Generally, we can use vector-valued functions to implement arbitrary subsets of the set formed from all predictor and coefficient functions. Such vector-valued functions would take as input both the feature vector output by the predictor feature function and the feature vector output by the coefficient feature function. Formally, let $i_1, i_2, \ldots, i_c \in \{1, 2, \ldots, K\}$ and $j_1, j_2,$ ..., $j_d \in \{1, 2, \ldots, K\}$ be increasing sequences of indices specifying which of the coefficient and predictor functions, respectively, are to be implemented by a single vector-valued function $\boldsymbol{F}$; we require that $c + d \geq 1$. We assume that such a function $\boldsymbol{F}$ takes as input both the coefficient and predictor feature vectors (this assumption is without loss of generality; we can replace the two feature functions with a single feature function with appropriate inputs). Without loss of generality, we require that the components of $\boldsymbol{F}$ correspond to the coefficient and/or predictor functions in the order given by the sequence $i_1, i_2, \ldots, i_c, j_1, j_2, \ldots, j_d$. We denote the parameters of $\boldsymbol{F}$ as $\zeta$. To summarize, our notation for a general vector-valued function $\boldsymbol{F}$ implementing an arbitrary subset of coefficient and predictor functions is:

$$\boldsymbol{F}(\boldsymbol{x} \mid \zeta) : \mathbb{R}^{p+q} \to \mathbb{R}^{c+d}, \tag{8}$$

where $\boldsymbol{x}$ can be interpreted as having been obtained by concatenating the outputs of some predictor feature function $\boldsymbol{f}$ and some coefficient feature function $\boldsymbol{g}$, for appropriate inputs to these feature functions.

For the sake of clarity, also in the case when a subset of coefficient and predictor functions are implemented using a vector-valued function $\boldsymbol{F}$ (as it was defined above), we denote the components of $\boldsymbol{F}$ as single-valued coefficient and predictor functions, that is $$\begin{array}{ll} \Lambda_{i_1}(\cdot) = \boldsymbol{F}_1(\cdot) & \Phi_{j_1}(\cdot) = \boldsymbol{F}_{c+1}(\cdot) \\ \Lambda_{i_2}(\cdot) = \boldsymbol{F}_2(\cdot) & \Phi_{j_2}(\cdot) = \boldsymbol{F}_{c+2}(\cdot) \\ \vdots & \vdots \\ \Lambda_{i_c}(\cdot) = \boldsymbol{F}_c(\cdot) & \Phi_{j_d}(\cdot) = \boldsymbol{F}_{c+d}(\cdot) \end{array}$$

where $\boldsymbol{F}_k$ denotes the $k$-th component of the output vector produced by $\boldsymbol{F}$.

For an arbitrary input sequence $\boldsymbol{d} = \langle d_1, d_2, \ldots, d_M \rangle$, we denote by $$q_k(\boldsymbol{d} \mid \boldsymbol{\theta}_k, \boldsymbol{\xi}_k) \equiv \sum_{l=1}^{M} \Lambda_k(\boldsymbol{g}(\boldsymbol{d}, M-l) \mid \boldsymbol{\xi}_k) \cdot \Phi_k(\boldsymbol{f}(d_l) \mid \boldsymbol{\theta}_k) \tag{9}$$

$$= \sum_{h=0}^{M-1} \Lambda_k(\boldsymbol{g}(\boldsymbol{d}, h) \mid \boldsymbol{\xi}_k) \cdot \Phi_k(\boldsymbol{f}(d_{M-h}) \mid \boldsymbol{\theta}_k) \tag{10}$$

$$= \sum_{h=0}^{M-1} \lambda_{k,h} \cdot \varphi_{k,M-h} \tag{11}$$

the *accumulated sum* of outputs of the predictor function $\Phi_k$, $1 \leq k \leq K$, applied to all elements of the input sequence up to index $m$, $1 \leq m \leq M$, scaled by the coefficient function $\Lambda_k$ supplied with the feature vector obtained from the input sequence and the corresponding position in the sequence, counted backwards from the last element in the sequence (this is made explicit by the change of index variable in (10) and (11)).

Figure 6:
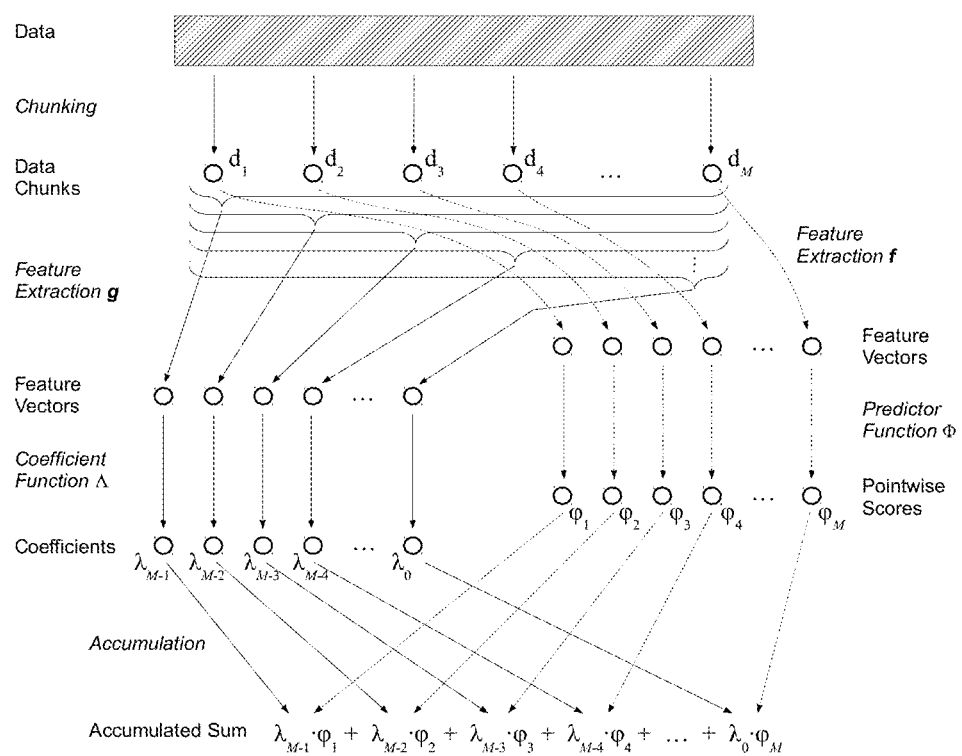
FIG. 6 is an illustrative representation of accumulation in a cumulative predictor model, in accordance with some embodiments of the technology described herein.

Figure 6 shows a schematic representation of the accumulation for a single target component employed by the Cumulative Predictor model, as given in equation (11)). The index of the target component is omitted for clarity, keeping only the indices over input elements. Tips of braces indicate the indices of elements in history relative to the $M$-th element that are scaled by corresponding coefficients.

Note that the coefficient functions $A_k$ (together with the coefficient feature function $g$) allow for a very general form of accumulation of pointwise scores for the $k$-th target component, with the following as special cases:

- plain sum $q_k = \sum_{h=0}^{M-1} \varphi k, M-h$

- averaged sum $q_k = \frac{1}{M} \sum_{h=0}^{M-1} \varphi k, M-h$

- truncated sum $q_k = \sum_{h=0}^{S-1} \varphi k, M-h$, where $S = \min\{M, I\}$, with $I$ being the maximum number of elements in history to accumulate over

- truncated averaged sum $q_k = \frac{1}{S} \sum_{h=0}^{S-1} \varphi k, M-h$, where $S$ has the same meaning as above

- sum with an exponential decay factor $q_k = \sum_{h=0}^{M-1} \gamma^h \cdot \varphi k, M-h$ where $\gamma$ can be treated as a constant or as a parameter to be learned

- sum with a parametric exponential decay factor $q_k = \sum_{h=0}^{M-1} \gamma(x)^h \cdot \varphi_{k,M-h}$, where $x$ is a parameter to be learned, and $\gamma$ can be for example the sigmoid function $\frac{1}{1+\exp(-x)}$ implementing "soft bounds" on the decay factor value limiting its value to the interval $(0,1)$.

- decayed sum with truncation, possibly with parametric decay factor (analogously to the cases with truncation above)

- *et cetera*

For the task of detecting dialogues going wrong, we may assume that as a basic option we use as the coefficient function a parametric exponential decay function, with history truncated beyond some size $H$ (see the list above). Note that the general results on using artificial neural networks to implement Cumulative Predictor models presented in Section 5 apply also to coefficient functions.

We use the following notation for the vector formed from sums of scaled outputs accumulated over an input sequence $$q(d \mid \theta_1, \xi_1, \theta_2, \xi_2, \ldots, \theta_K, \xi_K) \equiv \\ (q_1(d \mid \theta_1, \xi_1), q_2(d \mid \theta_2, \xi_2), \ldots, q_K(d \mid \theta_K, \xi_K)) \quad (12)$$

When considering an input sequence $d^n = \langle d_1^n, d_2^n, \ldots, d_{M_n}^n \rangle$ from a training example $(d^n, t^n)$, we use the following shorthand notation with superscript $n$ to indicate that the accumulated values relate to the $n$-th training example:

$$q_k^n \equiv q_k(d^n \mid \theta_k, \xi_k) \quad (13)$$

and $$q^n \equiv (q_1^n, q_2^n, \ldots, q_K^n). \quad (14)$$

We denote by $h$ an *activation function*

$$h : \mathbb{R}^K \to \mathbb{R}^K. \quad (15)$$

An activation function is a vector function, mapping vectors to vectors.

We denote by $y(d)$ the result of applying an activation function $h$ (which will be clear from context) to the vector of sums of outputs $q(d)$ accumulated over an input sequence $d = \langle d_1, d_2, \ldots, d_M \rangle$ $$y(d) = h(q(d)). \quad (16)$$

Explicitly, the components $y_k(d)$ are the corresponding components of the output of the activation function $h$ applied to $q(d)$, that is $$y_k(d) = h_k(q(d)), \quad (17)$$

where we use subscripts the indicate indices of vector components.

When considering an input sequence $\boldsymbol{d}^n = \langle d_1^n, d_2^n, \ldots, d_{M_n}^n \rangle$ from a training example $(\boldsymbol{d}^n, \boldsymbol{t}^n)$, we use the following shorthand notation with superscript $n$ to indicate relation to the $n$-th training example:

$$\boldsymbol{y}^n \equiv h(\boldsymbol{q}^n) \qquad (18)$$
$$= h(\boldsymbol{q}(\boldsymbol{d}^n)). \qquad (19)$$

If we assume that the labels denoting levels of badness are totally ordered, a natural activation function is the identity, corresponding to regression-like training of a Cumulative Predictor model, as we will see in Section 3.2.

We denote by $$\ell : \mathbb{R}^K \times \mathbb{R}^K \to \mathbb{R} \qquad (20)$$

a general *loss function*, which can be applied to the output of an activation function and a target (in this order). A loss function may be specific to the $n$-th training example $(\boldsymbol{d}^n, \boldsymbol{t}^n)$, in which case we use the notation $\ell^n$ with superscript $n$ indicating to which training example the loss function applies.

For regression-like training (and in conjunction with the identity activation function), a standard loss function that can be used is the squared error; again see Section 3.2 for details.

2   Cumulative Predictor Model Definition

A Cumulative Predictor model on a domain $\mathcal{D}$ is specified by the following components:

- target size $K$, $K \geq 1$

- predictor feature extraction function $\boldsymbol{f} : \mathcal{D} \to \mathbb{R}^p$

- coefficient feature extraction function $$\boldsymbol{g} : \bigcup_{j=1}^{\infty} \left( \mathcal{D}^j \times \{0, 1, \ldots, j-1\} \right) \to \mathbb{R}^q$$

- predictor functions $\Phi_k : \mathbb{R}^p \to \mathbb{R}$ parametrized by parameters $\boldsymbol{\theta}_k \in \mathbb{R}^{r_k}$ for $k = 1, 2, \ldots, K$

- coefficient functions $\Lambda_k : \mathbb{R}^q \to \mathbb{R}$ parametrized by parameters $\boldsymbol{\xi}_k \in \mathbb{R}^{s_k}$ for $k = 1, 2, \ldots, K$

- activation function $h : \mathbb{R}^K \to \mathbb{R}^K$

3 Training a Cumulative Predictor Model

In this section we derive results that allow for training a Cumulative Predictor model using a training data set. In order to be able to optimize the parameters of the predictor and coefficient functions, we need to specify an objective function whose value we aim to minimize on the training data. We show how to do so using loss functions and derive how to evaluate the gradient of the objective function in order to be able to optimize the parameters.

3.1 Objective Function

We assume that the training data $T = \{(d^1, t^1), (d^2, t^2), \ldots, (d^N, t^N)\}$ are independently and identically distributed, therefore we can assume that the *objective function*, or *error function*, $E$ on the training data set can be expressed as a sum of terms corresponding to individual training examples in the data set $$E(\theta_1, \xi_1, \ldots, \theta_K, \xi_K) = \sum_{n=1}^{N} E_n(\theta_1, \xi_1, \ldots, \theta_K, \xi_K), \qquad (21)$$

where $E_n$ is the error incurred by the $n$-th training example $(d^n, t^n)$. The error functions are functions of the parameters of the predictor and coefficient functions.

To control overfitting of a Cumulative Predictor model, we can include a regularization term $R(\theta_1, \xi_1, \ldots, \theta_K, \xi_K)$ in the objective function. It is convenient to take the average of the error function over training examples when adding the regularization term, leading to the following form of the objective function $$E(\theta_1, \xi_1, \ldots, \theta_K, \xi_K) = \frac{1}{N} \sum_{n=1}^{N} E_n(\theta_1, \xi_1, \ldots, \theta_K, \xi_K)$$
$$+ R(\theta_1, \xi_1, \ldots, \theta_K, \xi_K). \qquad (22)$$

More generally, the objective function can have the form $$E(\theta_1, \xi_1, \ldots, \theta_K, \xi_K) = \frac{1}{\sum w_n} \sum_{n=1}^{N} w_n E_n(\theta_1, \xi_1, \ldots, \theta_K, \xi_K)$$
$$+ R(\theta_1, \xi_1, \ldots, \theta_K, \xi_K), \qquad (23)$$

where $w_n \geq 0$ is a weight specifying the relative contribution of the $n$-th training example error to the overall error function value. This formulation subsumes the averaged error function in (22) by taking $w_n = 1$ for all $n = 1, 2, \ldots, N$.

We assume that for each training example $(\boldsymbol{d}^n, \boldsymbol{t}^n)$ there is an associated loss function $\ell^n$ so that the error $E_n$ for the $n$-th training example is given by $$E_n(\boldsymbol{\theta}_1, \boldsymbol{\xi}_1, \ldots, \boldsymbol{\theta}_K, \boldsymbol{\xi}_K) = \ell^n(\boldsymbol{y}^n, \boldsymbol{t}^n) \qquad (24)$$
$$= \ell^n(h(\boldsymbol{q}^n), \boldsymbol{t}^n), \qquad (25)$$

where $h$ is the activation function used by the Cumulative Predictor model.

3.2 Standard Activation and Loss Functions

Well-known combinations of activation and loss functions can be used in the Cumulative Predictor objective function. Below we list some of the best-known combinations, however the list is by no means exhaustive.

We can form an objective function for a single Cumulative Predictor model by combining different pairs of activation and loss functions for different disjoint subsets of components of the target vector; for clarity below we present the activation and loss function pairs as if they applied to the whole target vector.

We use the notation introduced in (13), (14), (16) and (17), omitting the superscript indicating the training example to avoid clutter.

Regression Regression objective uses as activation function the "linear" (that is, identity) function $$h : \boldsymbol{x} \mapsto \boldsymbol{x} \qquad (26)$$

and as loss function the squared error function $$\ell(\boldsymbol{y}, \boldsymbol{t}) = \frac{1}{2} \sum_{k=1}^{K} (y_k - t_k)^2. \qquad (27)$$

Here targets are general vectors $\boldsymbol{t} \in \mathbb{R}^K$.

Binary Classification Binary classification objective uses as activation function the logistic sigmoid function for each component, that is $$y_k = h_k(\boldsymbol{q}) = \frac{1}{1 + \exp(-q_k)} \qquad (28)$$

and as loss function the sum of two-class cross entropy functions for individual components $$\ell(\boldsymbol{y}, \boldsymbol{t}) = -\sum_{k=1}^{K} \{t_k \ln y_k + (1 - t_k) \ln(1 - y_k)\}. \qquad (29)$$

Here we assume that the $k$-th component of the target $t$ encodes membership in the $k$-th class among $K$ classes by taking value 0 or 1, that is $t \in \{0,1\}^K$; the target encodes independent memberships in $K$ different classes.

Multi-Class Classification Multi-class classification objective uses as activation function the "softmax" function, whose components are given by $$y_k = h_k(\boldsymbol{q}) = \frac{\exp q_k}{\sum_{k'=1}^{K} \exp q_{k'}} \qquad (30)$$

and as loss function the multi-class cross entropy function $$\ell(\boldsymbol{y}, \boldsymbol{t}) = -\sum_{k=1}^{K} t_k \ln y_k. \qquad (31)$$

Here we assume that target encodes class membership using the 1-of-$K$ encoding, that is $t \in \{0,1\}^K$ such that exactly one of its components is 1, others are 0 (indicating membership in the class corresponding to the component with value 1); the target encodes membership in exactly one of $K$ mutually exclusive classes.

Discrete Probability Distribution Fitting To fit discrete probability distributions, we can use the same activation and loss functions as in the previous case. Here we assume that the target $t$ encodes a discrete probability distribution, that is $t \in [0,1]^K$ and $\sum_{k=1}^{K} t_k = 1$. (Discrete probability distribution fitting subsumes multi-class classification as a special case.)

3.3 Optimization

A Cumulative Predictor Model can be trained by minimizing the objective function (23) on some training data set.

We show how to calculate the gradient of the objective function so that the objective function can be minimized using an optimization method requiring first-order gradient information. We deal only with the gradient of the general cumulative error function $E_n$ for a single training example given in (24), not the gradient of a possible regularization term in the overall objective function (23), as evaluating its gradient is an independent problem.

We first derive the general form of partial derivatives with respect to the parameters of the predictor functions and with respect to the parameters of the coefficient functions, giving specializations for disjoint and shared parameter vectors.

Then we show how the gradient simplifies for typical choices of activation and loss functions.

We assume that the overall objective function has the form as in (23), therefore we show how to obtain the gradient for the error $E_n$ on the $n$-th training example, omitting all superscripts indicating the training example to increase clarity by reducing clutter in the formulas.

In the formulae, we also omit explicit indication of dependence on parameters to avoid clutter, however we use the dependencies during the following calculations.

3.3.1 General Case — Coefficient and Predictor Functions Share the Same Parameters To derive the general formula for evaluating the gradient, we assume the general case where coefficient and predictor functions share the same parameters, which we denote as a single parameter vector $\zeta$ with components $\zeta_i$ (see also (8)).

The partial derivative with respect to the $i$-th parameter $\zeta_i$ can be expressed using the chain rule for partial derivatives (and the product rule for derivatives) as follows $$\frac{\partial E_n}{\partial \zeta_i} = \sum_{j=1}^{K} \frac{\partial E_n}{\partial q_j} \frac{\partial q_j}{\partial \zeta_i} \tag{32}$$

$$= \sum_{j=1}^{K} \frac{\partial E_n}{\partial q_j} \sum_{h=0}^{M-1} \frac{\partial}{\partial \zeta_i} \left[ \lambda_{jh} \cdot \varphi_{j,M-h} \right] \tag{33}$$

$$= \sum_{j=1}^{K} \frac{\partial E_n}{\partial q_j} \sum_{h=0}^{M_n-1} \left[ \varphi_{j,M_n-h} \cdot \frac{\partial \lambda_{jh}}{\partial \zeta_i} + \lambda_{jh} \cdot \frac{\partial \varphi_{j,M_n-h}}{\partial \zeta_i} \right] \tag{34}$$

3.3.2 Disjoint Case — Parameters of Coefficient Functions are Disjoint from Parameters of Predictor Functions When the parameters $\xi_k$ of the coefficient functions and the parameters $\theta_k$ of the predictor functions are disjoint, from (34) we obtain the following formula for the partial derivative with respect to the $i$-th parameter of the $k$-th coefficient function $\xi_{ki}$ $$\frac{\partial E_n}{\partial \xi_{ki}} = \sum_{j=1}^{K} \frac{\partial E_n}{\partial q_j} \sum_{h=0}^{M_n-1} \varphi_{j,M_n-h} \frac{\partial \lambda_{jh}}{\partial \xi_{ki}}. \tag{35}$$

and similarly for the partial derivative with respect to the $i$-th parameter of the $k$-th predictor function $\theta_{ki}$ $$\frac{\partial E_n}{\partial \theta_{ki}} = \sum_{j=1}^{K} \frac{\partial E_n}{\partial q_j} \sum_{h=0}^{M_n-1} \lambda_{jh} \frac{\partial \varphi_{j,M_n-h}}{\partial \theta_{ki}}. \tag{36}$$

The above formulae simplify even further in the case when parameter vectors of all coefficient and predictor functions are pairwise disjoint. From the assumption of pairwise disjointness we get that $\frac{\partial \varphi_{jm}}{\partial \theta_{ki}} = \delta_{jk} \frac{\partial \varphi_{km}}{\partial \theta_{ki}}$ and $\frac{\partial \lambda_{jh}}{\partial \xi_{ki}} = \delta_{jk} \frac{\partial \lambda_{kh}}{\partial \xi_{ki}}$ (where $\delta_{jk}$ is the Kronecker delta), therefore $$\frac{\partial E_n}{\partial \theta_{ki}} = \frac{\partial E_n}{\partial q_k} \sum_{h=0}^{M_n-1} \lambda_{kh} \frac{\partial \varphi_{k,M_n-h}}{\partial \theta_{ki}}. \tag{37}$$

and $$\frac{\partial E_n}{\partial \xi_{ki}} = \frac{\partial E_n}{\partial q_k} \sum_{h=0}^{M_n-1} \varphi_{k,M_n-h} \frac{\partial \lambda_{kh}}{\partial \xi_{ki}}. \tag{38}$$

4 Runtime Usage of a Cumulative Predictor Model

A Cumulative Predictor model for a specific task can be readily used for on-the-fly estimation of target values from input elements coming in. (Note that at runtime, the Cumulative Model should use the same activation function $h$ that was used during training.)

Concretely, as input elements $d_m$, $m = 1, 2, \ldots$, come in, we treat them as input sequences $\boldsymbol{d}_m = \langle d_1, d_2, \ldots, d_m \rangle$ and evaluate target estimates $$\boldsymbol{y}(\boldsymbol{d}_m) = h(\boldsymbol{q}(\boldsymbol{d}_m)). \tag{39}$$

Explicitly, components $q_k(\boldsymbol{d}_m)$ of the vector $\boldsymbol{q}(\boldsymbol{d}_m)$ are obtained using (10)

$$q_k(\boldsymbol{d}_m) = q_k(\boldsymbol{d}_m \mid \boldsymbol{\theta}_k, \boldsymbol{\xi}_k)$$
$$= \sum_{h=0}^{m-1} \Lambda_k(\boldsymbol{g}(\boldsymbol{d}_m, h) \mid \boldsymbol{\xi}_k) \cdot \Phi_k(\boldsymbol{f}(d_{m-h}) \mid \boldsymbol{\theta}_k).$$

Note that in order to obtain valid target estimates at each point in time, we need to reset the accumulation over incoming elements whenever the elements should be considered as coming from a new input sequence.

Target estimates produced by a Cumulative Predictor model can be used as the basis for making decisions in the given task. Such decision-making logic is typically task-specific and requires tuning using held-out data. The problem of designing and implementing decision-making logic for some task applies to Machine Learning methods in general and is the subject of decision theory, therefore we do not deal with it here.

5 Implementing Cumulative Predictor Model using Artificial Neural Networks

When implementing a Cumulative Predictor model, usually the main components to implement are the predictor functions. Note that coefficient functions would typically be simpler and parametrized by a small number of parameters, with partial derivatives available through straightforward calculation.

However in order to present general results, in this section we show how to use the above derived results for calculating the gradient in the case when both predictor and coefficient functions are implemented using artificial neural networks.

The below stated results apply also in the case when neural networks implementing different component functions share some or all parameters (by a component function we mean a predictor or coefficient function). For example, we can use a single neural network with $K$ outputs to implement all predictor functions.

The gradient with respect to the parameters (usually called weights) of an artificial neural network can be efficiently computed using the so-called and well-known backpropagation algorithm. (We do not give any details of the algorithm here, assuming that it is readily available and known.)

As one of its inputs, the backpropagation algorithm needs the so-called *errors*, that is partial derivatives of the objective function with respect to the sums of inputs to the output units of the neural network, which for predictor functions are equal to $$\frac{\partial E_n}{\partial \varphi_{k,M_n-h}} = \sum_{l=1}^{K} \frac{\partial E_n}{\partial q_l} \frac{\partial q_l}{\partial \varphi_{k,M_n-h}} \qquad (40)$$

$$= \sum_{l=1}^{K} \frac{\partial E_n}{\partial q_l} \left[ \delta_{kl} \cdot \lambda_{lh} \right] \qquad (41)$$

$$= \lambda_{kh} \frac{\partial E_n}{\partial q_k}. \qquad (42)$$

and similarly for coefficient functions are equal to $$\frac{\partial E_n}{\partial \lambda_{kh}} = \sum_{l=1}^{K} \frac{\partial E_n}{\partial q_l} \frac{\partial q_l}{\lambda_{kh}} \qquad (43)$$

$$= \sum_{l=1}^{K} \frac{\partial E_n}{\partial q_l} \left[ \delta_{kl} \cdot \varphi_{l,M_n-h} \right] \qquad (44)$$

$$= \varphi_{k,M_n-h} \frac{\partial E_n}{\partial q_k}. \qquad (45)$$

in both cases for $h = 0, 1, \ldots, M_n - 1$. (The symbol $\delta_{kl}$ denotes Kronecker delta, which is 1 if $k = l$, 0 otherwise.)

Therefore, what remains to be able to calculate concrete values needed for the backpropagation algorithm, both for predictor and coefficient functions, are the partial derivatives $\frac{\partial E_n}{\partial q_k}$.

For the combinations of activation and loss functions described in section 3.2 (and many other standard combinations of output layer activation and loss functions), as is well known and can be straightforwardly checked, we obtain $$\frac{\partial E_n}{\partial q_k} = y_k - t_k. \tag{46}$$

Putting together (42), (45) and (46), for the cases in section 3.2 (and many other standard combinations of output layer activation and loss functions) we have that the so-called error for an output unit of a neural network implementing a predictor function $\Phi_k$ is $$\frac{\partial E_n}{\partial \varphi_{k,M_n-h}} = \lambda_{kh} \cdot (y_k - t_k) \tag{47}$$

and the so-called error for an output unit of a neural network implementing a coefficient function $\Lambda_k$ is $$\frac{\partial E_n}{\partial \lambda_{kh}} = \varphi_{k,M_n-h} \cdot (y_k - t_k), \tag{48}$$

in both cases for $h = 0, 1, \ldots, M_n - 1$.

6 Augmenting Training Data with Derived Training Examples

In some situations it may be possible to augment the training data set with *derived* training examples that utilize further task-specific information that can be "extracted" from the original training examples so that a better-performing Cumulative Predictor model can be trained for the given task. This involves also the design of loss functions that would allow for utilizing the derived training examples during the training of a model.

6.1 Example Task

We show this general approach on the following example task: Let us assume that we are given logs of dialogues between users and a spoken dialogue application, and the dialogues are annotated with levels of badness so that the first occurrence of the worst level of badness occurring in a dialogue is annotated. Further we assume that the levels of badness are totally ordered; thus we will denote them $1, 2, \ldots, L$, $L > 0$, with the label 1 denoting a dialogue that completed without any problem at all and $L$ denoting the complete failure of the spoken dialogue system in the given dialogue, and values between these two denoting increasing levels of badness.

We assume that we use the regression objective to train a Cumulative Predictor model for this task (this means that we use the linear activation function given in (26)). For the sake of clarity of exposition, we assume that in the overall objective function for original training examples the standard squared error function given in (27) is used.

To obtain a well-performing Cumulative Predictor model, it may be advantageous to transform the labels in some way, using a monotone function $g : \{1, 2, \ldots, L\} \to \mathbb{R}$, preserving the total ordering of the labels. Such a function may, for example, map the "OK" label to 0, and transform the other labels so that the transformed label values and distances between adjacent transformed label values represent as best as possible the information conveyed in the original labels and can be taken most advantage of by the used loss function. In order to avoid clutter, below we use the original label values in place of their possibly transformed values.

6.2 Task-specific Loss Functions for Derived Training Examples

To be able to take advantage of the information conveyed in a sparsely labeled sequence in the form of derived training examples, we typically need task-specific loss functions associated with derived examples.

We show a possible loss function suitable for our example task; in order to obtain good performance, other loss functions may be more appropriate. From the assumptions about the annotation that we have described in the previous section it follows that for a dialogue annotated with label $l$, $1 \leq l \leq L$, at some point in the dialogue, it holds that at no point before the annotated point label $l$ or worse could have been assigned.

Therefore, we can form derived training examples by taking initial subsequences of the annotated dialogue up to the annotated point, and associate with them an "interval-insensitive" loss function incurring loss if the label estimated by the model is outside of the closed interval $[1, l]$.

Specifically, when regressing a single value as is the case in the considered example task, we can define the *interval-insensitive squared error* function as $$\ell_{(g_l;g_r)}(y, t) = \begin{cases} \frac{1}{2}(y - (t - g_l))^2 & \text{if } y < t - g_l, \\ \frac{1}{2}(y - (t + g_r))^2 & \text{if } y > t + g_r, \\ 0 & \text{otherwise.} \end{cases}$$

The loss function $\ell_{(g_l;g_r)}$ is insensitive (that is, evaluates to zero) in the region around the target value defined by its real-valued non-negative parameters $g_l$ and $g_r$; the subscript $(g_l; g_r)$ indicates the widths of the insensitive regions to the left $(g_l)$ and right $(g_r)$ from the target value, respectively; in other words, in the interval $[t - g_l, t + g_r]$ the loss function incurs no loss, outside of this interval it incurs the standard squared error loss.

If we use a neural network to implement the predictor function employed by the Cumulative Predictor model for this task and we use the linear (identity) activation function for the output layer of the neural network, it is straightforward to derive the "error" for the output unit analogous to the result given in (47).

The above straightforwardly generalizes to higher-dimensional target vectors.

Note that generally, for a task, it will be necessary to design a task-specific loss function or possibly multiple loss functions capable of utilizing "additional" information that can be extracted from the original training data. Devising such loss functions will typically require expert knowledge and experimental verification.

6.3 Task-specific Derived Training Examples

We now show a possible way of deriving training examples for the example task described in section 6.1. There may be other ways of doing so, which would have to be verified on an available training data set.

We assume that we are given a training data set $T = \{(\boldsymbol{d}^1, t^1), (\boldsymbol{d}^2, t^2), \ldots, (\boldsymbol{d}^N, t^N)\}$, where for each $n = 1, 2, \ldots, N$, the input sequence $\boldsymbol{d}^n = \langle d_1^n, d_2^n, \ldots, d_{M_n}^n \rangle$ represents a dialogue up to and including the point annotated with the label $t^n$ (in other words, we assume that original dialogues annotates with "not-OK" labels have been truncated just after the annotated point and that "OK" dialogues are taken in their entirety).

Given the assumptions on the annotation, for a training example $(\boldsymbol{d}^n, t^n)$ we can safely derive training examples $(\boldsymbol{d}^{n1}, t^n), (\boldsymbol{d}^{n2}, t^n), \ldots, (\boldsymbol{d}^{n,M_n-1}, t^n)$, where $$\boldsymbol{d}^{ni} = \langle d_1^n, d_2^n, \ldots, d_i^n \rangle \qquad \text{for } i = 0, 1, \ldots, M_n - 1 \qquad (49)$$

are the initial sub-sequences of the original input sequence ending *before* the annotated element. We associate with all these derived training examples a loss function insensitive in the interval from the "OK" label value 1 to the label value $t^n$, that is the loss function $\ell_{(t^n-1; 0)}$. (Note that we may, given our assumptions on the annotation, create additional derived training examples using initial sub-sequences of the original input sequence ending *after* the annotated element and associate them with the same loss function $\ell_{(t^n-1; 0)}$.)

In order not to skew the training data excessively in favor of the derived training examples, we can assign weights $w_{ni}$ to them to limit their contribution to the overall objective function value. A possible way of assigning weights is to have the weights of training examples derived from a single original training example sum to one, that is $$\sum_i w_{ni} = 1 \qquad (50)$$

for all $n = 1, 2, \ldots, N$, where $w_{ni} \geq 0$. (In the case we describe, for each $n$ we sum over $i = 1, 2, \ldots, M_n - 1$.) This can be achieved for example by using uniform weights $w_{ni} = 1/(M_n - 1)$, or via some other way of distributing the weights.

Note that generally, for a given task, it may be required to specifically design the form of derived training examples so as to maximize the performance of some Cumulative Predictor model on the task. Devising how to derive training examples so as to utilize to the largest possible extent the information available in the original training data (in conjunction with designing loss functions as discussed in previous section) would typically require expert knowledge and experimental verification.

7 Straightforward Generalizations of Cumulative Predictor Model

In the previous sections we have assumed that the Cumulative Predictor model is aimed at on-the-fly prediction during runtime, producing estimates as input elements come in, and that accordingly it uses as training data sequences with targets associated with the last elements of the sequences. This setting allowed us to keep the notation concise and with its help the calculations easy to follow.

The Cumulative Predictor model can be easily generalized to other settings than the one we have used up to now. Below we briefly discuss possible generalizations.

Form of Training Examples We can straightforwardly extend the model to handle training examples where possibly more than one elements in input sequences are annotated with targets, and the annotated elements can be placed anywhere in the element sequence.

Online Prediction with Lag In some situations where we want online/on-the-fly estimates of target values, it may be advantageous to wait a while to obtain better target estimates, that is make predictions with some lag. The cumulative model can be straightforwardly extended to include a *lag*, that is produce estimates for elements that occurred a fixed number of elements "before" the last one in an input sequence. Lag has to be accounted for in two places in the accumulation of scores over sequence elements, namely the summation index range and the domains of inputs to the coefficient feature extraction function, which has to accommodate that we scale also elements occurring after the element for which a target estimate is being computed. Training examples have to be treated accordingly.

Offline Prediction with Unbounded Lookaheads For offline prediction, it may be advantageous to use the whole input sequence for producing target estimates for elements in the sequence, that is, use as much context as possible for producing a target estimate for an element of the sequence. We may think of this setting as using unbounded lookaheads to both sides from a considered element. Analogously to the previous case, the unbounded lookaheads have to be accounted for in two places in the accumulation of scores over sequence elements, namely the summation index range (from negative to positive infinity) and the domains of inputs to the coefficient feature extraction function (considering potentially the whole input sequence, the relative index of the element whose contribution is being scaled ranging from negative to positive infinity). In practice, and depending on the task, for computational reasons the sizes of the lookaheads have to be bounded.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the process 400 described with reference to FIG. 4) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for conducting a call between a caller and an interactive communication system, the method comprising:
    using at least one computer hardware processor to perform:
        obtaining a plurality of dialog chunks comprising both information provided by the caller to the interactive communication system and information provided by the interactive communication system to the caller;
        generating, based on the plurality of dialog chunks including both the information provided by the caller to the interactive communication system and the information provided by the interactive communication system to the caller, a respective plurality of feature sets, each of the plurality of feature sets comprising at least one feature generated using a respective dialog chunk of the plurality of dialog chunks;
        determining, based on the plurality of feature sets, a respective plurality of dialog chunk scores;
        determining, based at least in part on the plurality of dialog chunk scores, a likelihood that the caller is dissatisfied with the interactive communication system; and
        when the likelihood exceeds a threshold, performing a remedial action that alters a manner in which the call is handled.

2. The method of claim 1, wherein performing the remedial action comprises transferring the call to a human operator.

3. The method of claim 1, wherein performing the remedial action comprises changing a dialog plan according to which the interactive communication system interacts with the caller during the call.

4. The method of claim 1, wherein the plurality of feature sets includes a first feature set generated based on a first dialog chunk in the plurality of dialog chunks, the first feature set comprising a feature selected from the group consisting of: a feature indicating how well the information provided by the caller in the first dialog chunk matches input that the interactive communication system expected the caller would provide, a feature indicating that the caller requested assistance from a human operator, a feature indicating that the caller expressed dissatisfaction, a feature indicating a confidence in results of performing automated speech recognition on input provided by the caller, and a feature indicating an internal state of the interactive communication system.

5. The method of claim 1, wherein determining the likelihood that the caller is dissatisfied with the interactive communication system comprises:
determining, based at least in part on the plurality of feature sets, a plurality of respective weights for scores in the plurality of dialog chunk scores; and
calculating the likelihood as a weighted linear combination of dialog chunk scores in which the dialog chunk scores are weighted by weights in the plurality of weights.

6. The method of claim 5, wherein determining the plurality of respective weights is performed using a first neural network.

7. The method of claim 6, wherein determining the plurality of dialog chunk scores is performed using a second neural network different from the first neural network.

8. An interactive communication system configured to conduct a call with a caller, the interactive communication system comprising:
at least one computer hardware processor configured to perform:
obtaining a plurality of dialog chunks comprising both information provided by the caller to the interactive communication system and information provided by the interactive communication system to the caller;
generating, based on the plurality of dialog chunks including both the information provided by the caller to the interactive communication system and the information provided by the interactive communication system to the caller, a respective plurality of feature sets, each of the plurality of feature sets comprising at least one feature generated using a respective dialog chunk of the plurality of dialog chunks;
determining, based on the plurality of feature sets, a respective plurality of dialog chunk scores;
determining, based at least in part on the plurality of dialog chunk scores, a likelihood that the caller is dissatisfied with the interactive communication system; and
when the likelihood exceeds a threshold, performing a remedial action that alters a manner in which the call is handled.

9. The interactive communication system of claim 8, wherein performing the remedial action comprises transferring the call to a human operator and/or changing a dialog plan according to which the interactive communication system interacts with the caller during the call.

10. The interactive communication system of claim 8, wherein the plurality of feature sets includes a first feature set generated based on a first dialog chunk in the plurality of dialog chunks, the first feature set comprising a feature selected from the group consisting of: a feature indicating how well the information provided by the caller in the first dialog chunk matches input that the interactive communication system expected the caller would provide, a feature indicating that the caller requested assistance from a human operator, a feature indicating that the caller expressed dissatisfaction, a feature indicating a confidence in results of performing automated speech recognition on input provided by the caller, and a feature indicating an internal state of the ICS system.

11. The interactive communication system of claim 8, wherein determining the likelihood that the caller is dissatisfied with the interactive communication system comprises:
determining, based at least in part on the plurality of feature sets, a plurality of respective weights for scores in the plurality of dialog chunk scores; and
calculating the likelihood as a weighted linear combination of dialog chunk scores in which the dialog chunk scores are weighted by weights in the plurality of weights.

12. The interactive communication system of claim 11, wherein determining the plurality of respective weights is performed using a first neural network.

13. The interactive communication system of claim 12, wherein determining the plurality of dialog chunk scores is performed using a second neural network different from the first neural network.

14. At least one non-transitory computer-readable storage medium storing processor-executable instructions that, when executed by at least one computer hardware processor, cause the at least one computer hardware processor to perform a method for conducting a call between a caller and an interactive communication system, the method comprising:
obtaining a plurality of dialog chunks comprising both information provided by the caller to the interactive communication system and information provided by the interactive communication system to the caller;
generating, based on the plurality of dialog chunks including both the information provided by the caller to the interactive communication system and the information provided by the interactive communication system to the caller, a respective plurality of feature sets, each of the plurality of feature sets comprising at least one feature generated using a respective dialog chunk of the plurality of dialog chunks;
determining, based on the plurality of feature sets, a respective plurality of dialog chunk scores;
determining, based at least in part on the plurality of dialog chunk scores, a likelihood that the caller is dissatisfied with the interactive communication system; and
when the likelihood exceeds a threshold, performing a remedial action that alters a manner in which the call is handled.

15. The at least one non-transitory computer readable storage medium of claim 14, wherein performing the remedial action comprises transferring the call to a human operator.

16. The at least one non-transitory computer readable storage medium of claim 14, wherein performing the remedial action comprises changing a dialog plan according to which the interactive communication system interacts with the caller during the call.

17. The at least one non-transitory computer readable storage medium of claim 14, wherein the plurality of feature sets includes a first feature set generated based on a first dialog chunk in the plurality of dialog chunks, the first feature set comprising a feature selected from the group consisting of: a feature indicating how well the information provided by the caller in the first dialog chunk matches input that the interactive communication system expected the caller would provide, a feature indicating that the caller requested assistance from a human operator, a feature indicating that the caller expressed dissatisfaction, a feature indicating a confidence in results of performing automated speech recognition on input provided by the caller, and a feature indicating an internal state of the interactive communication system.

18. The at least one non-transitory computer readable storage medium of claim 14, wherein determining the likelihood that the caller is dissatisfied with the interactive communication system comprises:

determining, based at least in part on the plurality of feature sets, a plurality of respective weights for scores in the plurality of dialog chunk scores; and calculating the likelihood as a weighted linear combination of dialog chunk scores in which the dialog chunk scores are weighted by weights in the plurality of weights.

19. The at least one non-transitory computer readable storage medium of claim 18, wherein determining the plurality of respective weights is performed using a first neural network.

20. The at least one non-transitory computer readable storage medium of claim 19, wherein determining the plurality of dialog chunk scores is performed using a second neural network different from the first neural network.

\* \* \* \* \*